(12) United States Patent
Maamari et al.

(10) Patent No.: US 12,426,081 B2
(45) Date of Patent: Sep. 23, 2025

(54) PRIORITIZATION FOR REDUCING SEMI-PERSISTENT SCHEDULING OR CONFIGURED GRANT BLIND DECODING

(71) Applicant: QUALCOMM Incorporated, San Diego, CA (US)

(72) Inventors: Diana Maamari, San Diego, CA (US); Ahmed Elshafie, San Diego, CA (US); Prashanth Haridas Hande, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 17/931,712

(22) Filed: Sep. 13, 2022

(65) Prior Publication Data
US 2024/0090016 A1    Mar. 14, 2024

(51) Int. Cl.
| | |
|---|---|
| *H04W 72/566* | (2023.01) |
| *H04L 1/00* | (2006.01) |
| *H04W 72/11* | (2023.01) |
| *H04W 72/115* | (2023.01) |
| *H04W 72/1263* | (2023.01) |
| *H04W 72/23* | (2023.01) |
| *H04W 72/542* | (2023.01) |

(52) U.S. Cl.
CPC ......... *H04W 72/569* (2023.01); *H04L 1/0003* (2013.01); *H04L 1/0038* (2013.01); *H04W 72/1263* (2013.01); *H04W 72/23* (2023.01); *H04W 72/542* (2023.01)

(58) Field of Classification Search
CPC .......... H04W 72/569; H04W 72/1263; H04W 72/23; H04W 72/542; H04W 72/115; H04W 72/11; H04L 1/0003; H04L 1/0038
See application file for complete search history.

(56) References Cited

U.S. PATENT DOCUMENTS

| | | | |
|---|---|---|---|
| 2016/0066255 A1* | 3/2016 | Marinier ............... | H04W 48/16 370/350 |
| 2022/0337303 A1* | 10/2022 | Li .......................... | H04L 5/0051 |
| 2023/0122052 A1* | 4/2023 | Zhou ................. | H04W 74/0841 370/329 |
| 2024/0188083 A1* | 6/2024 | Kittichokechai ..... | H04L 1/1893 |
| 2025/0008514 A1* | 1/2025 | Chien ................. | H04W 72/231 |

* cited by examiner

*Primary Examiner* — Harry H Kim
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, configuration information indicating configurations for a plurality of configured grants. The UE may receive, from the network node, a transmit prioritization indication associated with the plurality of configured grants. The UE may transmit, to the network node, an uplink communication in a configured grant selected from the plurality of configured grants based at least in part on the transmit prioritization indication. Numerous other aspects are described.

30 Claims, 13 Drawing Sheets

PRIORITIZATION FOR REDUCING SEMI-PERSISTENT SCHEDULING OR CONFIGURED GRANT BLIND DECODING

FIELD OF THE DISCLOSURE

Aspects of the present disclosure generally relate to wireless communication and to techniques and apparatuses for prioritization for reducing semi-persistent scheduling (SPS) or configured grant (CG) blind decoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, configuration information indicating configurations for a plurality of configured grants. The method may include receiving, from the network node, a transmit prioritization indication associated with the plurality of configured grants. The method may include transmitting, to the network node, an uplink communication in a configured grant selected from the plurality of configured grants based at least in part on the transmit prioritization indication.

Some aspects described herein relate to a method of wireless communication performed by a network node. The method may include transmitting, to a UE, configuration information indicating configurations for a plurality of configured grants. The method may include transmitting, to the UE, a transmit prioritization indication associated with the plurality of configured grants. The method may include receiving, from the UE, an uplink communication in a configured grant of the plurality of configured grants using blind decoding based at least in part on the transmit prioritization indication.

Some aspects described herein relate to a method of wireless communication performed by a UE. The method may include receiving, from a network node, configuration information indicating a plurality of semi-persistent scheduling (SPS) configurations. The method may include receiving, from the network node, a transmit prioritization indication associated with the plurality of SPS configurations. The method may include receiving, from the network node, a downlink communication in SPS resources associated with an SPS configuration of the plurality of SPS configurations using blind decoding based at least in part on the transmit prioritization indication.

Some aspects described herein relate to a method of wireless communication performed by a network node. The method may include transmitting, to a UE, configuration information indicating a plurality of SPS configurations. The method may include transmitting, to the UE, a transmit prioritization indication associated with the plurality of SPS configurations. The method may include transmitting, to the UE, a downlink communication in SPS resources associated with an SPS configuration selected from the plurality of SPS configurations based at least in part on the transmit prioritization indication.

Some aspects described herein relate to a UE for wireless communication. The UE may include a memory and one or more processors coupled to the memory. The one or more processors may be configured to receive, from a network node, configuration information indicating configurations for a plurality of configured grants. The one or more processors may be configured to receive, from the network node, a transmit prioritization indication associated with the plurality of configured grants. The one or more processors may be configured to transmit, to the network node, an uplink communication in a configured grant selected from the plurality of configured grants based at least in part on the transmit prioritization indication.

Some aspects described herein relate to a network node for wireless communication. The network node may include a memory and one or more processors coupled to the memory. The one or more processors may be configured to transmit, to a UE, configuration information indicating configurations for a plurality of configured grants. The one or more processors may be configured to transmit, to the UE, a transmit prioritization indication associated with the plurality of configured grants. The one or more processors may be configured to receive, from the UE, an uplink communication in a configured grant of the plurality of configured grants using blind decoding based at least in part on the transmit prioritization indication.

Some aspects described herein relate to a UE for wireless communication. The UE may include a memory and one or more processors coupled to the memory. The one or more processors may be configured to receive, from a network node, configuration information indicating a plurality of SPS configurations. The one or more processors may be configured to receive, from the network node, a transmit prioritization indication associated with the plurality of SPS configurations. The one or more processors may be configured to receive, from the network node, a downlink communication in SPS resources associated with an SPS configuration of the plurality of SPS configurations using blind decoding based at least in part on the transmit prioritization indication.

Some aspects described herein relate to a network node for wireless communication. The network node may include a memory and one or more processors coupled to the memory. The one or more processors may be configured to transmit, to a UE, configuration information indicating a plurality of SPS configurations. The one or more processors may be configured to transmit, to the UE, a transmit prioritization indication associated with the plurality of SPS configurations. The one or more processors may be configured to transmit, to the UE, a downlink communication in SPS resources associated with an SPS configuration selected from the plurality of SPS configurations based at least in part on the transmit prioritization indication.

Some aspects described herein relate to a non-transitory computer-readable medium that stores a set of instructions for wireless communication by a UE. The set of instructions, when executed by one or more processors of the UE, may cause the UE to receive, from a network node, configuration information indicating configurations for a plurality of configured grants. The set of instructions, when executed by one or more processors of the UE, may cause the UE to receive, from the network node, a transmit prioritization indication associated with the plurality of configured grants. The set of instructions, when executed by one or more processors of the UE, may cause the UE to transmit, to the network node, an uplink communication in a configured grant selected from the plurality of configured grants based at least in part on the transmit prioritization indication.

Some aspects described herein relate to a non-transitory computer-readable medium that stores a set of instructions for wireless communication by a network node. The set of instructions, when executed by one or more processors of the network node, may cause the network node to transmit, to a UE, configuration information indicating configurations for a plurality of configured grants. The set of instructions, when executed by one or more processors of the network node, may cause the network node to transmit, to the UE, a transmit prioritization indication associated with the plurality of configured grants. The set of instructions, when executed by one or more processors of the network node, may cause the network node to receive, from the UE, an uplink communication in a configured grant of the plurality of configured grants using blind decoding based at least in part on the transmit prioritization indication.

Some aspects described herein relate to a non-transitory computer-readable medium that stores a set of instructions for wireless communication by a UE. The set of instructions, when executed by one or more processors of the UE, may cause the UE to receive, from a network node, configuration information indicating a plurality of SPS configurations. The set of instructions, when executed by one or more processors of the UE, may cause the UE to receive, from the network node, a transmit prioritization indication associated with the plurality of SPS configurations. The set of instructions, when executed by one or more processors of the UE, may cause the UE to receive, from the network node, a downlink communication in SPS resources associated with an SPS configuration of the plurality of SPS configurations using blind decoding based at least in part on the transmit prioritization indication.

Some aspects described herein relate to a non-transitory computer-readable medium that stores a set of instructions for wireless communication by a network node. The set of instructions, when executed by one or more processors of the network node, may cause the network node to transmit, to a UE, configuration information indicating a plurality of SPS configurations. The set of instructions, when executed by one or more processors of the network node, may cause the network node to transmit, to the UE, a transmit prioritization indication associated with the plurality of SPS configurations. The set of instructions, when executed by one or more processors of the network node, may cause the network node to transmit, to the UE, a downlink communication in SPS resources associated with an SPS configuration selected from the plurality of SPS configurations based at least in part on the transmit prioritization indication.

Some aspects described herein relate to an apparatus for wireless communication. The apparatus may include means for receiving, from a network node, configuration information indicating configurations for a plurality of configured grants. The apparatus may include means for receiving, from the network node, a transmit prioritization indication associated with the plurality of configured grants. The apparatus may include means for transmitting, to the network node, an uplink communication in a configured grant selected from the plurality of configured grants based at least in part on the transmit prioritization indication.

Some aspects described herein relate to an apparatus for wireless communication. The apparatus may include means for transmitting, to a UE, configuration information indicating configurations for a plurality of configured grants. The apparatus may include means for transmitting, to the UE, a transmit prioritization indication associated with the plurality of configured grants. The apparatus may include means for receiving, from the UE, an uplink communication in a configured grant of the plurality of configured grants using blind decoding based at least in part on the transmit prioritization indication.

Some aspects described herein relate to an apparatus for wireless communication. The apparatus may include means for receiving, from a network node, configuration information indicating a plurality of SPS configurations. The apparatus may include means for receiving, from the network node, a transmit prioritization indication associated with the plurality of SPS configurations. The apparatus may include means for receiving, from the network node, a downlink communication in SPS resources associated with an SPS configuration of the plurality of SPS configurations using blind decoding based at least in part on the transmit prioritization indication.

Some aspects described herein relate to an apparatus for wireless communication. The apparatus may include means for transmitting, to a UE, configuration information indicating a plurality of SPS configurations. The apparatus may include means for transmitting, to the UE, a transmit prioritization indication associated with the plurality of SPS configurations. The apparatus may include means for transmitting, to the UE, a downlink communication in SPS resources associated with an SPS configuration selected from the plurality of SPS configurations based at least in part on the transmit prioritization indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
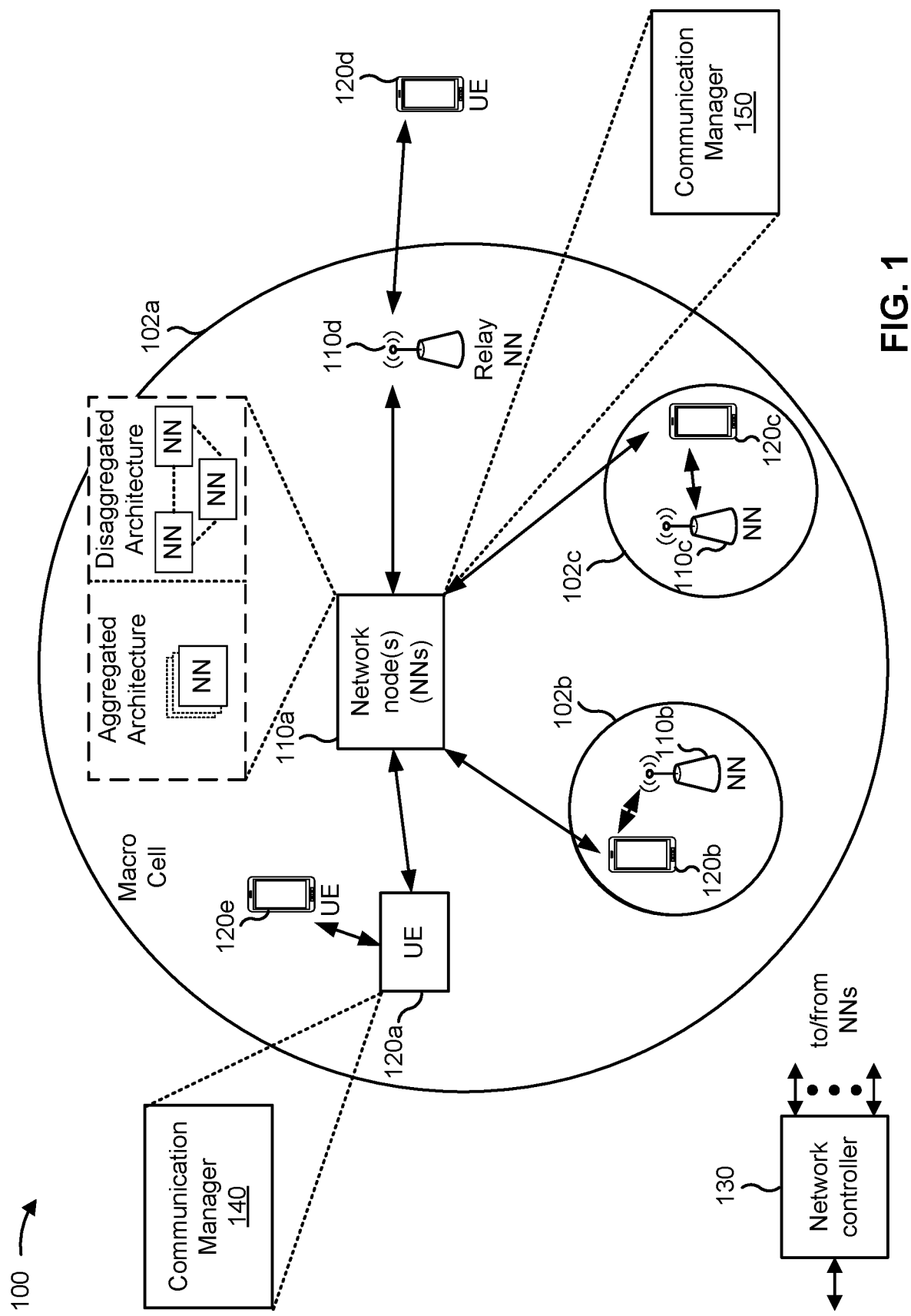
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, configuration information indicating configurations for a plurality of configured grants; receive, from the network node, a transmit prioritization indication associated with the plurality of configured grants; and transmit, to the network node, an uplink communication in a configured grant selected from the plurality of configured grants based at least in part on the transmit prioritization indication. Additionally, or alternatively, the communication manager 140 may perform one or more other operations described herein.

In some aspects, as described in more detail elsewhere herein, the communication manager 140 may receive, from a network node, configuration information indicating a plurality of semi-persistent scheduling (SPS) configurations; receive, from the network node, a transmit prioritization indication associated with the plurality of SPS configurations; and receive, from the network node, a downlink communication in SPS resources associated with an SPS configuration of the plurality of SPS configurations using blind decoding based at least in part on the transmit prioritization indication. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information indicating configurations for a plurality of configured grants; transmit, to the UE, a transmit prioritization indication associated with the plurality of configured grants; and receive, from the UE, an uplink communication in a configured grant of the plurality of configured grants using blind decoding based at least in part on the transmit prioritization indication. Additionally, or alternatively, the communication manager 150 may perform one or more other operations described herein.

In some aspects, the as described in more detail elsewhere herein, the communication manager 150 may transmit, to a UE, configuration information indicating a plurality of SPS configurations; transmit, to the UE, a transmit prioritization indication associated with the plurality of SPS configurations; and transmit, to the UE, a downlink communication in SPS resources associated with an SPS configuration selected from the plurality of SPS configurations based at least in part on the transmit prioritization indication. Additionally, or alternatively, the communication manager 150 may perform one or more other operations described herein.

As indicated above, FIG. 1 is provided as an example. Other examples may differ from what is described with regard to FIG. 1.

Figure 2:
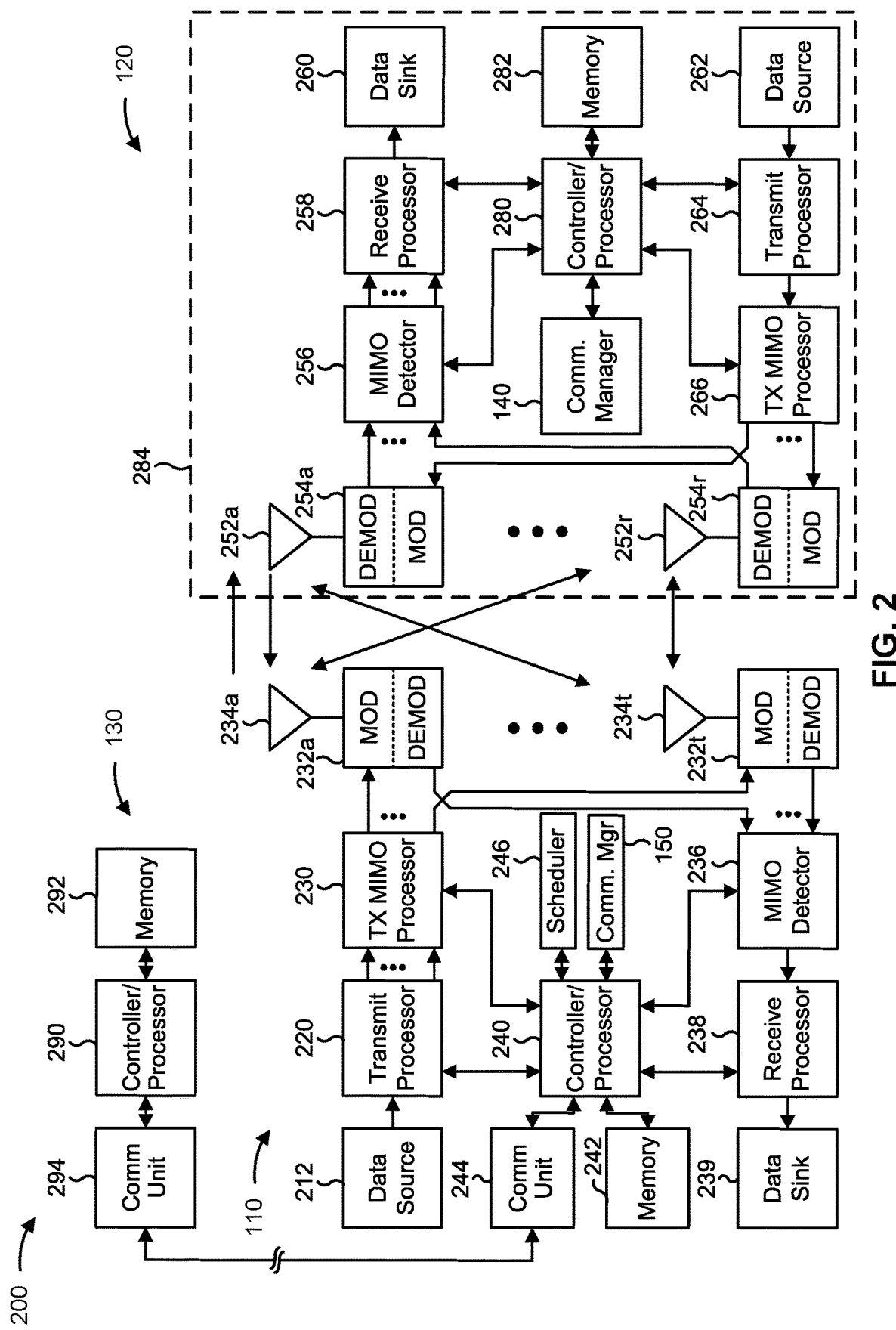
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the network node 110, the controller/processor 280 of the UE 120, and/or any other component(s) of FIG. 2 may perform one or more techniques associated with prioritization for reducing SPS or configured grant blind decoding, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, configuration information indicating configurations for a plurality of configured grants; means for receiving, from the network node, a transmit prioritization indication associated with the plurality of configured grants; and/or means for transmitting, to the network node, an uplink communication in a configured grant selected from the plurality of configured grants based at least in part on the transmit prioritization indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for receiving, from a network node, configuration information indicating a plurality of SPS configurations; means for receiving, from the network node, a transmit prioritization indication associated with the plurality of SPS configurations; and/or means for receiving, from the network node, a downlink communication in SPS resources associated with an SPS configuration of the plurality of SPS configurations using blind decoding based at least in part on the transmit prioritization indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, configuration information indicating configurations for a plurality of configured grants; means for transmitting, to the UE, a transmit prioritization indication associated with the plurality of configured grants; and/or means for receiving, from the UE, an uplink communication in a configured grant of the plurality of configured grants using blind decoding based at least in part on the transmit prioritization indication. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the network node 110) includes means for transmitting, to a UE, configuration information indicating a plurality of SPS configurations; means for transmitting, to the UE, a transmit prioritization indication associated with the plurality of SPS configurations; and/or means for transmitting, to the UE, a downlink communication in SPS resources associated with an SPS configuration selected from the plurality of SPS configurations based at least in part on the transmit prioritization indication. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
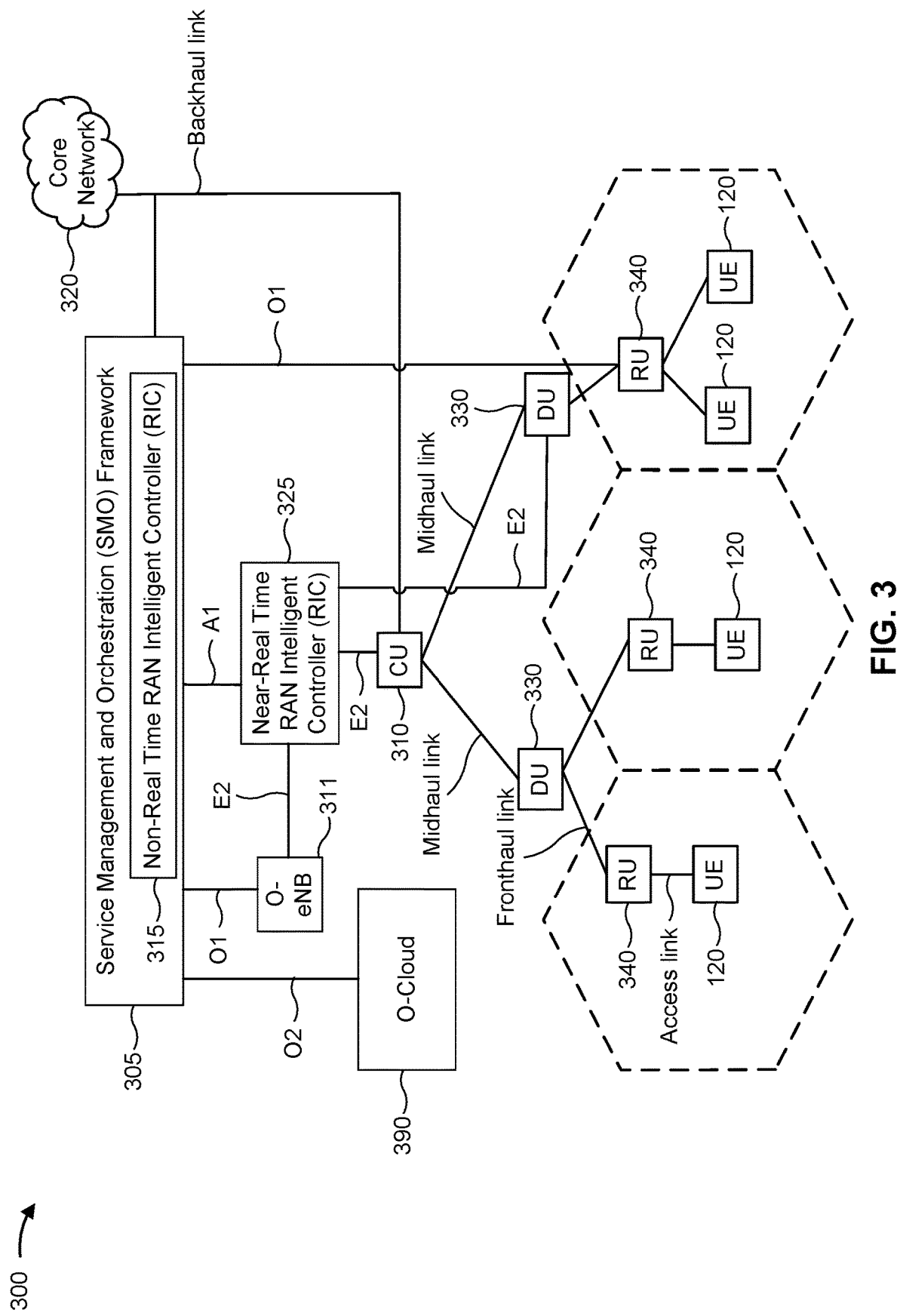
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
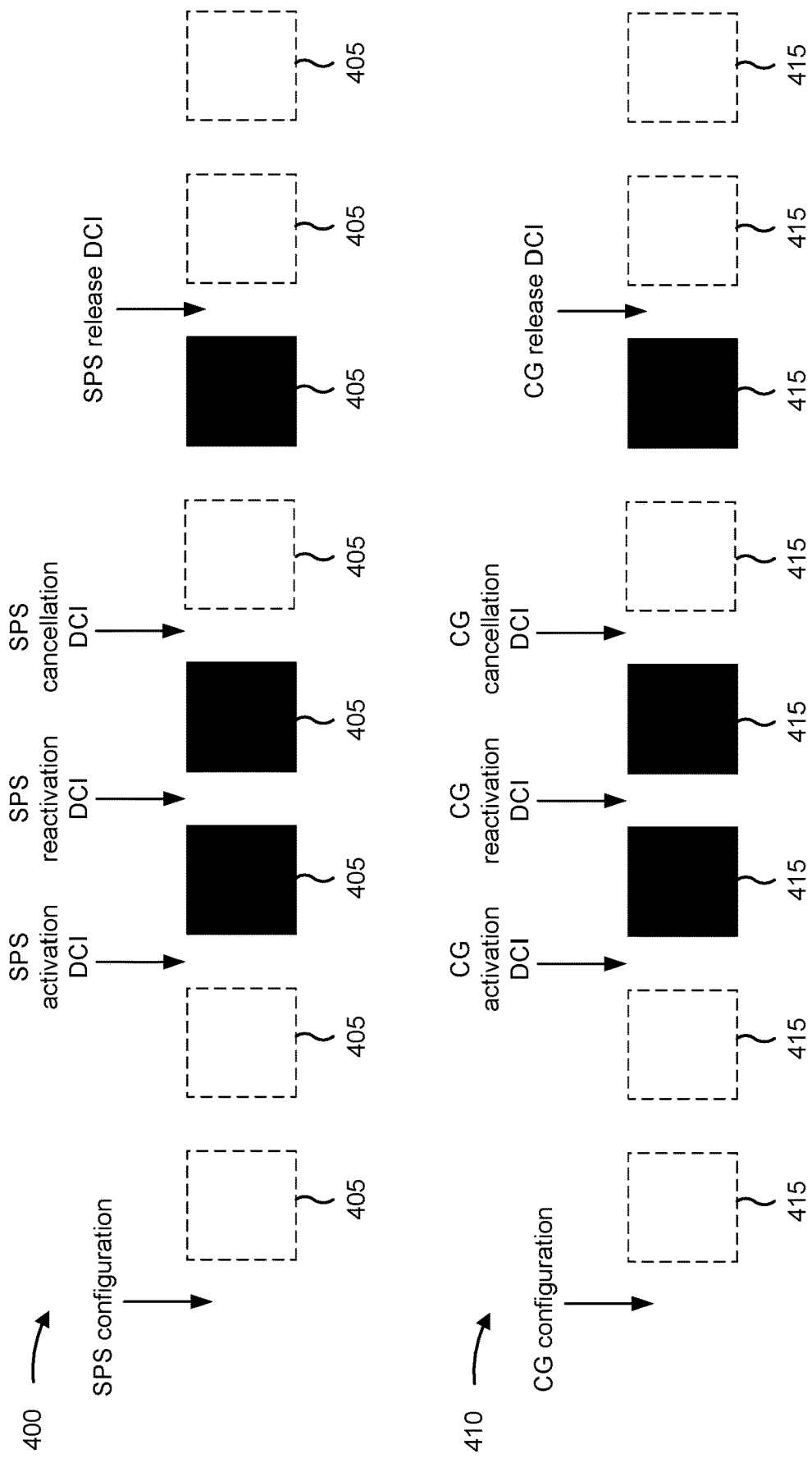
FIG. 4 is a diagram illustrating an example of downlink semi-persistent scheduling (SPS) communication and an example of uplink configured grant (CG) communication, in accordance with the present disclosure.

FIG. 4 is a diagram illustrating an example 400 of downlink SPS communication and an example 410 of uplink configured grant (CG) communication, in accordance with the present disclosure. SPS communications may include periodic downlink communications that are configured for a UE, such that a network node does not need to transmit (e.g., directly or via one or more network nodes) separate downlink control information (DCI) to schedule each downlink communication, thereby conserving signaling overhead. CG communications may include periodic uplink communications that are configured for a UE, such that the network node does not need to transmit (e.g., directly or via one or more network nodes) separate DCI to schedule each uplink communication, thereby conserving signaling overhead.

As shown in example 400, a UE may be configured with an SPS configuration for SPS communications. For example, the UE may receive the SPS configuration via an RRC message transmitted by a network node (e.g., directly to the UE or via one or more network nodes). The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 405 for the UE. The SPS configuration may also configure hybrid automatic repeat request (HARD)-acknowledgement (ACK) (HARQ-ACK) feedback resources for the UE to transmit HARQ-ACK feedback for SPS physical downlink shared channel (PDSCH) communications received in the SPS occasions 405. For example, the SPS configuration may indicate a PDSCH-to-HARQ feedback timing value, which may be referred to as a K1 value in a wireless communication standard (e.g., a 3GPP standard).

The network node may transmit SPS activation DCI to the UE (e.g., directly or via one or more network nodes) to activate the SPS configuration for the UE. The network node may indicate, in the SPS activation DCI, communication parameters, such as an MCS, a resource block (RB) allocation, and/or antenna ports, for the SPS PDSCH communications to be transmitted in the scheduled SPS occasions 405. The UE may begin monitoring the SPS occasions 405 based at least in part on receiving the SPS activation DCI. For example, beginning with a next scheduled SPS occasion 405 subsequent to receiving the SPS activation DCI, the UE may monitor the scheduled SPS occasions 405 to decode PDSCH communications using the communication parameters indicated in the SPS activation DCI. The UE may refrain from monitoring configured SPS occasions 405 prior to receiving the SPS activation DCI.

The network node may transmit SPS reactivation DCI to the UE (e.g., directly or via one or more network nodes) to change the communication parameters for the SPS PDSCH communications. Based at least in part on receiving the SPS reactivation DCI, the UE may begin monitoring the scheduled SPS occasions 405 using the communication parameters indicated in the SPS reactivation DCI. For example, beginning with a next scheduled SPS occasion 405 subsequent to receiving the SPS reactivation DCI, the UE may monitor the scheduled SPS occasions 405 to decode PDSCH communications based on the communication parameters indicated in the SPS reactivation DCI.

In some cases, such as when there is not have downlink traffic to transmit to the UE, the network node may transmit SPS cancellation DCI to the UE (e.g., directly or via one or more network nodes) to temporarily cancel or deactivate one or more subsequent SPS occasions 405 for the UE. The SPS cancellation DCI may deactivate only a subsequent one SPS occasion 405 or a subsequent N SPS occasions 405 (where N is an integer). SPS occasions 405 after the one or more (e.g., N) SPS occasions 405 subsequent to the SPS cancellation DCI may remain activated. Based at least in part on receiving the SPS cancellation DCI, the UE may refrain from monitoring the one or more (e.g., N) SPS occasions 405 subsequent to receiving the SPS cancellation DCI. As shown in example 400, the SPS cancellation DCI cancels one subsequent SPS occasion 405 for the UE. After the SPS occasion 405 (or N SPS occasions) subsequent to receiving the SPS cancellation DCI, the UE may automatically resume monitoring the scheduled SPS occasions 405.

The network node may transmit SPS release DCI to the UE (e.g., directly or via one or more network nodes) to deactivate the SPS configuration for the UE. The UE may stop monitoring the scheduled SPS occasions 405 based at least in part on receiving the SPS release DCI. For example, the UE may refrain from monitoring any scheduled SPS occasions 405 until another SPS activation DCI is received by the UE. Whereas the SPS cancellation DCI may deactivate only a subsequent one SPS occasion 405 or a subsequent N SPS occasions 405, the SPS release DCI deactivates all subsequent SPS occasions 405 for a given SPS configuration for the UE until the given SPS configuration is activated again by a new SPS activation DCI.

As shown in example 410, a UE may be configured with a CG configuration for CG communications. For example, the UE may receive the CG configuration via an RRC message transmitted by a network node (e.g., directly to the UE or via one or more network nodes). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 415 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The UE may be configured with a type of uplink CG (e.g., Type 1) that does not require DCI activation, or a type of uplink CG (e.g., Type 2) that requires DCI activation. In a case in which the UE is configured with the type of uplink CG that requires DCI activation, the network node may transmit CG activation DCI to the UE (e.g., directly or via one or more network nodes) to activate the CG configuration for the UE. The network node may indicate, in the CG activation DCI, communication parameters, such as an MCS, an RB allocation, and/or antenna ports, for the CG physical uplink shared channel (PUSCH) communications to be transmitted in the scheduled CG occasions 415. The UE may begin transmitting in the CG occasions 415 based at least in part on receiving the CG activation DCI. For example, beginning with a next scheduled CG occasion 415 subsequent to receiving the CG activation DCI, the UE may transmit PUSCH communications in the scheduled CG occasions 415 using the communication parameters indicated in the CG activation DCI. The UE may refrain from transmitting in configured CG occasions 415 prior to receiving the CG activation DCI.

The network node may transmit CG reactivation DCI to the UE (e.g., directly or via one or more network nodes) to change the communication parameters for the CG PUSCH communications. Based at least in part on receiving the CG reactivation DCI, and the UE may begin transmitting in the scheduled CG occasions 415 using the communication parameters indicated in the CG reactivation DCI. For example, beginning with a next scheduled CG occasion 415 subsequent to receiving the CG reactivation DCI, the UE may transmit PUSCH communications in the scheduled CG occasions 415 based at least in part on the communication parameters indicated in the CG reactivation DCI.

In some cases, such as when the network node needs to override a scheduled CG communication for a higher priority communication, the network node may transmit CG cancellation DCI to the UE (e.g., directly or via one or more network nodes) to temporarily cancel or deactivate one or more subsequent CG occasions 415 for the UE. The CG cancellation DCI may deactivate only a subsequent one CG occasion 415 or a subsequent N CG occasions 415 (where N is an integer). CG occasions 415 after the one or more (e.g., N) CG occasions 415 subsequent to the CG cancellation DCI may remain activated. Based at least in part on receiving the CG cancellation DCI, the UE may refrain from transmitting in the one or more (e.g., N) CG occasions 415 subsequent to receiving the CG cancellation DCI. As shown in example 410, the CG cancellation DCI cancels one subsequent CG occasion 415 for the UE. After the CG occasion 415 (or N CG occasions) subsequent to receiving the CG cancellation DCI, the UE may automatically resume transmission in the scheduled CG occasions 415.

The network node may transmit CG release DCI to the UE (e.g., directly or via one or more network nodes) to deactivate the CG configuration for the UE. The UE may stop transmitting in the scheduled CG occasions 415 based at least in part on receiving the CG release DCI. For example, the UE may refrain from transmitting in any scheduled CG occasions 415 until another CG activation DCI is received by the UE. Whereas the CG cancellation DCI may deactivate only a subsequent one CG occasion 415 or a subsequent N CG occasions 415, the CG release DCI deactivates all subsequent CG occasions 415 for a given CG configuration for the UE until the given CG configuration is activated again by a new CG activation DCI.

As indicated above, FIG. 4 is provided as an example. Other examples may differ from what is described with respect to FIG. 4.

In some cases, to increase flexibility for supporting different service types, multiple active uplink CG configurations per bandwidth part (BWP) per serving cell may be supported for a UE. For example, in Release 16 of the 3GPP standard, a maximum number of uplink CG configurations per BWP of a serving cell is 12, and simultaneous activation of multiple uplink CG configurations per BWP is supported. In this case, up to 12 uplink CGs (e.g., Type 1 and/or Type 2) may be simultaneously activated on an active BWP. In some examples, multiple CGs that overlap in the time domain may be configured and activated for a UE. In this case, the UE may select one of the CGs to use to transmit a PUSCH communication to a network node, and the network node may perform blind decoding (also referred to as "blind detection") of the CGs to detect which CG is used to transmit the PUSCH communication and decode PUSCH communication. However, blind decoding of multiple active CGs may result in increased network complexity, for example due to the number of blind decoding operations required for large candidate transport block (TB) sizes for CG PUSCH communications, which may result in increased consumption of processing resources and network resources, as well as increased power consumption at the network node.

Some techniques and apparatuses described herein enable prioritization for reducing CG blind decoding by a network node. In some aspects, the network node may transmit, and a UE may receive, configuration information indicating configurations for a plurality of CGs. The network node may transmit, and the UE may receive, a transmit prioritization indication associated with the plurality of CGs. The UE may transmit an uplink communication in a CG selected from the plurality of CGs based at least in part on the transmit prioritization indication, and the network node may receive the uplink communication in the CG using blind decoding based at least in part on the transmit prioritization indication. As a result, the number of blind decoding operations performed by the network node is decreased in cases in which multiple CGs configured for a UE overlap in the time domain, which reduces the consumption of processing resources and network resources by the network node and reduces power consumption at the network node.

In some cases, to increase flexibility for supporting different service types, multiple active downlink SPS configurations per BWP per serving cell may be supported for a UE. For example, in Release 16 of the 3GPP standard, a maximum number of downlink SPS configurations per BWP of a serving cell is 8, and simultaneous activation of multiple SPS configurations per BWP is supported. In this case, up to 8 downlink SPS configurations may be simultaneously activated on an active BWP. In some examples, multiple SPS configurations with SPS resources that overlap in the time domain may be configured and activated for a UE. In this case, the network node may select one of the SPS configurations to use to transmit a PDSCH communication to the UE, and the UE may perform blind decoding (or blind detection) of the SPS resources of the SPS configurations to detect which SPS resources are used to transmit the PDSCH communication and decode PDSCH communication. However, blind decoding of the SPS resources of multiple active SPS configurations may result in increased power consumption at the UE, which may decrease a battery life of the UE.

Some techniques and apparatuses described herein enable prioritization for reducing SPS blind decoding by a UE. In some aspects, a network node may transmit, and the UE may receive, configuration information indicating a plurality of SPS configurations. The network node may transmit, and the UE may receive, a transmit prioritization indication associated with the plurality of SPS configurations. The network node may transmit a downlink communication in SPS resources associated with an SPS configuration selected from the plurality of SPS configurations based at least in part on the transmit prioritization indication, and the UE may receive the downlink communication using blind decoding based at least in part on the transmit prioritization indication. As a result, the number of blind decoding operations performed by the UE is decreased in cases in which SPS resources of multiple SPS configurations overlap in the time domain, which reduces the power consumption at the UE and increases the battery life of the UE.

Figure 5:
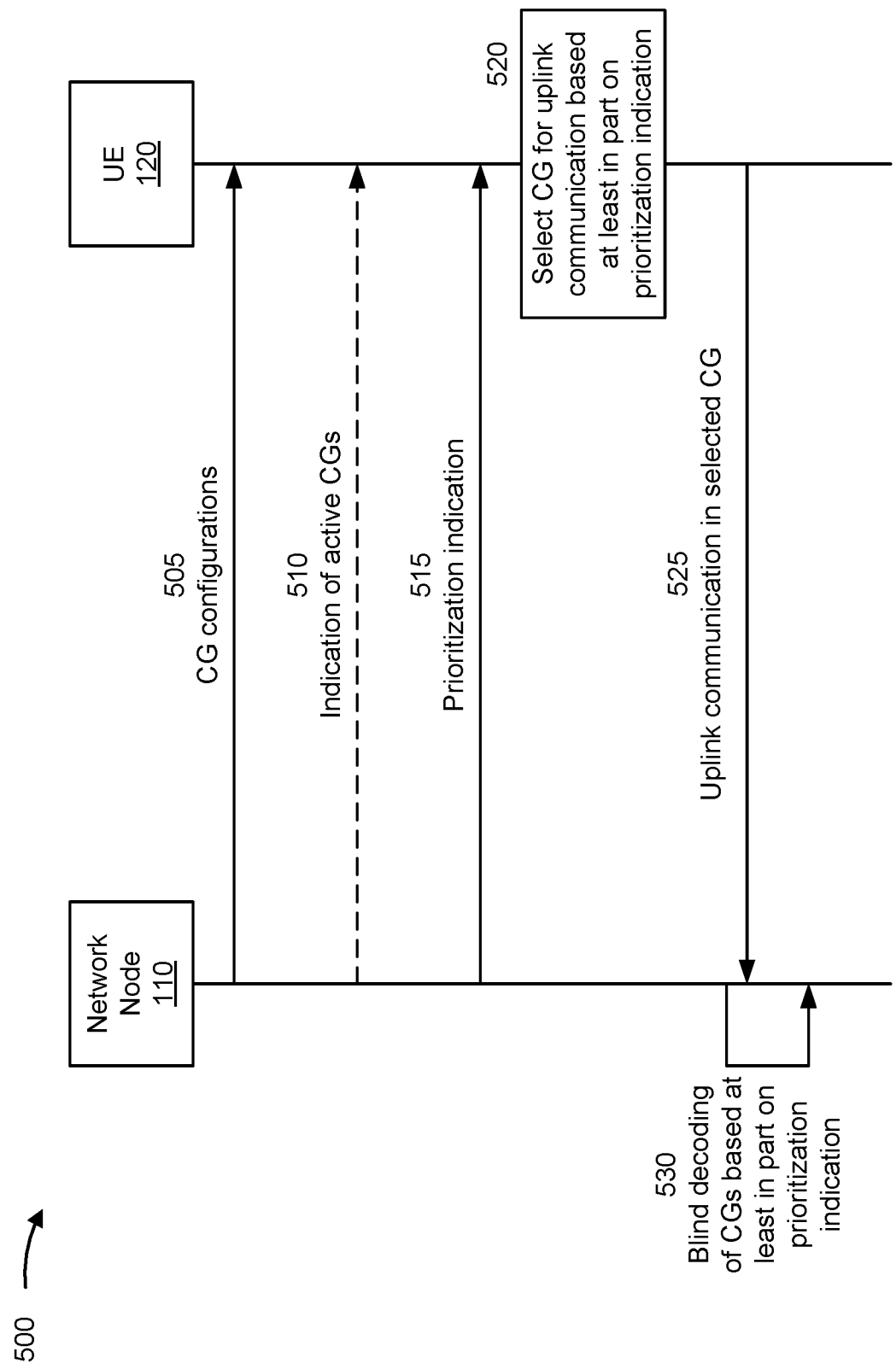
FIGS. 5-6 are diagrams illustrating examples associated with prioritization for reducing CG blind decoding, in accordance with the present disclosure.

FIG. 5 is a diagram illustrating an example 500 associated with prioritization for reducing CG blind decoding, in accordance with the present disclosure. As shown in FIG. 5, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 5, and by reference number 505, the network node 110 may transmit, to the UE 120 a plurality of CG configurations. The UE 120 may receive the plurality of CG configurations transmitted by the network node 110. In some aspects, the network node 110 may transmit, and the UE 120 may receive, configuration information that indicates the plurality of CG configurations. For example, the configuration information may indicate configurations for a plurality of CGs. Each CG, of the plurality of CGs, may correspond to a respective set of CG resources indicated in a respective CG configuration. For example, the configuration may indicate, for each CG, a resource allocation for transmitting CG uplink communications (e.g., in a time domain, a frequency domain, a spatial domain, and/or a code domain) and a periodicity at which the resource allocation is repeated. The plurality of CGs may include Type 1 CGs (e.g., that do not require DCI activation) and/or Type 2 CGs (e.g., that do require DCI activation). In some aspects, the configuration information that indicates the configurations for the plurality of CGs may be transmitted to the UE 120 in one or more RRC messages.

As further shown in FIG. 5, and by reference number 510, in some aspects, the network node 110 may transmit, and the UE 120 may receive, an indication of active CGs of the plurality of CGs configured for the UE 120. For example, the network node 110 may transmit, and the UE 120 may receive, CG activation DCI that indicates activation of one or more CGs of the plurality of CGs configured for the UE 120. In some aspects, the network node 110 may transmit the CG activation DCI to the UE 120 to activate one or more Type 2 CGs configured for the UE 120. In this case, the periodic CG occasions for the Type 2 CGs may be activated for the UE 120 based at least in part on the UE 120 receiving the CG activation DCI.

In some aspects, one or more Type 1 CGs configured for the UE 120 may not require DCI activation. In some aspects, in a case in which the configuration information indicates configurations for a plurality of Type 1 CGs, and/or in a case in which no configured Type 2 CGs are to be activated for the UE 120, the network node 110 may not transmit the indication of the active CGs (e.g., the CG activation DCI) to the UE 120. In this case, the periodic CG occasions for the Type 1 CGs may be activated for the UE 120 based at least in part on the UE 120 receiving the CG configurations, without receiving the CG activation DCI.

As further shown in FIG. 5, and by reference number 515, the network node 110 may transmit, to the UE 120, a transmit prioritization indication associated with the plurality of CGs configured for the UE 120. The UE 120 may receive, from the network node 110, the transmit prioritization indication associated with the plurality of CGs. The transmit prioritization indication may indicate a prioritization of the CGs to be applied by the UE 120 for selecting a CG in which to transmit an uplink communication (e.g., a PUSCH communication) to the network node 110. In some aspects, the transmit prioritization indication may indicate an order in which the plurality CGs (or multiple active CGs of the plurality of CGs) are to be evaluated by the UE 120 to select a CG in which to transmit an uplink communication. For example, the order of the plurality of CGs (or the multiple active CGs) indicated by the transmit prioritization indication may correspond to an order in which the network node 110 is to perform blind decoding of the plurality of CGs (or the multiple active CGs). In some aspects, the transmit prioritization indication may indicate respective priorities for the plurality of CGs configured for the UE 120. In some aspects, the transmit prioritization indication may indicate respective priorities for multiple active CGs of the plurality of CGs configured for the UE 120.

In some aspects, the network node 110 may transmit the transmit prioritization indication to the UE 120 via layer 1 (L1), layer 2 (L2), or layer 3 (L3) signaling. For example, the transmit prioritization indication may be included in an RRC message, a medium access control (MAC) control element (MAC-CE), or DCI. In some aspects, the transmit prioritization for the plurality of CGs may be semi-statically configured for the UE 120. In some aspects, the transmit prioritization may be dynamically indicated. In some aspects, the transmit prioritization indication may be included in the configuration information that indicates the configurations for the plurality of CGs. In some aspects, the transmit prioritization indication may be included in the downlink communication (e.g., the CG activation DCI) that indicates multiple active CGs of the plurality of CGs configured for the UE 120. In some aspects, the transmit prioritization indication may be transmitted in a separate downlink communication from the configuration information and the CG activation DCI.

In some aspects, the network node 110 may determine the transmit prioritization indicated by the transmit prioritization indication based at least in part on an estimation of an uplink signal-to-interference-plus-noise ratio (SINR) performed by the network node 110. For example, in a case in which the uplink SINR is high (e.g., greater than a threshold), CGs configured with lower MCSs may be deprioritized relative to CGs configured with higher MCSs, and/or in a case in which the uplink SINR is low (e.g., less than a threshold) CGs configured with higher MCSs may be deprioritized relative to CGs configured with lower MCSs. In some aspects, the network node 110 may determine the transmit prioritization indicated by the transmit prioritization indication based at least in part on a comparison of the estimated uplink SINR and one or more thresholds. In some aspects, the transmit prioritization indication may indicate an order of CGs from highest MCS to lowest MCS in connection with a determination that the uplink SINR is greater than a first threshold (T1) and less than a second threshold (T2). For example, in a case in which there are three configured or active CGs, the transmit prioritization indication may indicate an order of CG1, CG2, CG3, where the MCS of CG1>the MCS of CG2>the MCS of CG3, in connection with a determination that T2>SINR>T1. In some aspects, the transmit prioritization indication may indicate an order of CGS from lowest MCS to highest MCS in connection with a determination that the uplink SINR is less than a threshold (e.g., a third threshold (T3)). For example, in a case in which there are three configured or active CGs, the transmit prioritization indication may indicate an order of CG1, CG2, CG3, where the MCS of CG1<the MCS of CG2<the MCS of CG3, in connection with a determination that SINR<T3. In some aspects, the prioritization indicated by the transmit prioritization indication may be defined in or based at least in part on a wireless communication standard (e.g., the 3GPP standard).

As further shown in FIG. 5, and by reference number 520, the UE 120 may select a CG for transmitting an uplink communication based at least in part on the prioritization indication. In some aspects, in a case in which multiple active CGs overlap in the time domain (e.g., in the same uplink slot), the UE 120 may select, from the multiple active CGs, a CG in which to transmit an uplink communication based at least in part on the transmit prioritization indication and based at least in part on at least one of an MCS configured for the CG or a TB size (TBS) of the uplink communication to be transmitted. The UE 120 may evaluate the CGs in the order indicated by the transmit prioritization indication, starting with a highest priority CG, to select a CG with a sufficient MCS and/or sufficient resources for the TBS of the uplink communication. For example, the UE 120 may select a highest priority CG (in accordance with the transmit prioritization indication) with sufficient MCS and/or resources for the uplink communication to be transmitted by the UE 120.

As shown by reference number 525, the UE 120 may transmit the uplink communication in the selected CG. For example, the uplink communication may be a PUSCH communication. As shown by reference number 530, the network node 110 may perform blind decoding of the plurality of CGs based at least in part on the transmit prioritization indication. The network node 110 may receive and decode the uplink communication transmitted by the UE 120 using blind decoding based at least in part on the transmit prioritization indication. In some aspects, in a case in which multiple active CGs overlap in the time domain (e.g., in the same uplink slot), the network node 110 may perform blind decoding of one or more of the CGs in the order indicated by the transmit prioritization indication. For example, the network node 110 may perform the blind decoding starting with a highest priority CG, and the network node 110 may stop blind decoding once the network node 110 detects an uplink communication in a CG. By performing the blind decoding of the CGs in the same order as used by the UE 120 to select the CG in which to transmit the uplink communication, the blind decoding operations performed by the network node 110 to receive and decode the uplink communication may be reduced, as compared to performing blind decoding without the transmit prioritization indication.

As indicated above, FIG. 5 is provided as an example. Other examples may differ from what is described with respect to FIG. 5.

Figure 6:
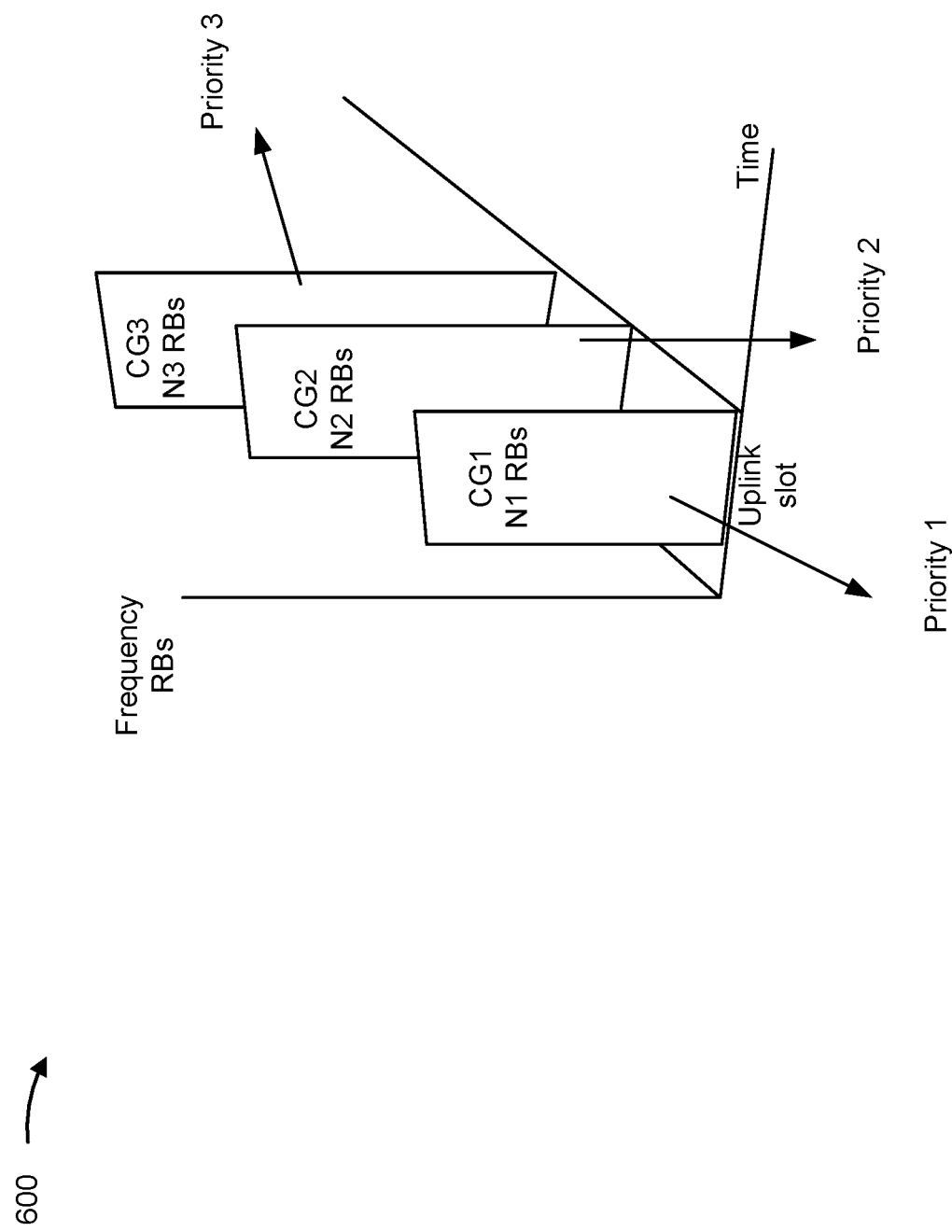

FIG. 6 is a diagram illustrating an example 600 associated with prioritization for reducing CG blind decoding, in accordance with the present disclosure. As shown in FIG. 6, a first CG (CG1), a second CG (CG2), and a third CG (CG3) configured for a UE may overlap in an uplink slot. CG1 may be configured with a first number (N1) of RBs in the frequency domain, CG2 may be configured with a second number (N2) of RBs in the frequency domain, and CG3 may be configured with a third number (N3) of RBs in the frequency domain. The UE may receive a transmit prioritization indication from a network node, and the transmit prioritization indication may indicate a first priority (Priority 1) for CG1, a second priority (Priority 2) for CG2, and a third priority (Priority 3) for CG3. For example, Priority 1 may be a higher priority than Priority 2, which may be a higher priority than Priority 3, such that the order for the UE to evaluate the CGs to select a CG for transmitting an uplink communication in the uplink slot is CG1→CG2→CG3. The UE may evaluate the CGs in the order indicated by the transmit prioritization indication to select a CG for transmitting the uplink communication based at least in part on a TBS of the uplink communication and/or an MCS configured for each CG. For example, the UE may first evaluate whether the resources (e.g., the N1 RBs) configured for CG1 are sufficient to transmit the TBS of the uplink communication. If the UE determines that CG1 is configured with sufficient resources for the TBS of the uplink communication, the UE may transmit the uplink communication in CG1. If the UE determines that resources configured for CG1 are not sufficient for the TBS of the uplink communication, the UE may then evaluate whether the resources (e.g., the N2 RBs) configured for CG2 are sufficient for transmitting the TBS of the uplink communication. If the UE determines that CG2 is configured with sufficient resources for the TBS of the uplink communication, the UE may transmit the uplink communication in CG2.

As indicated above, FIG. 6 is provided as an example. Other examples may differ from what is described with respect to FIG. 6.

Figure 7:
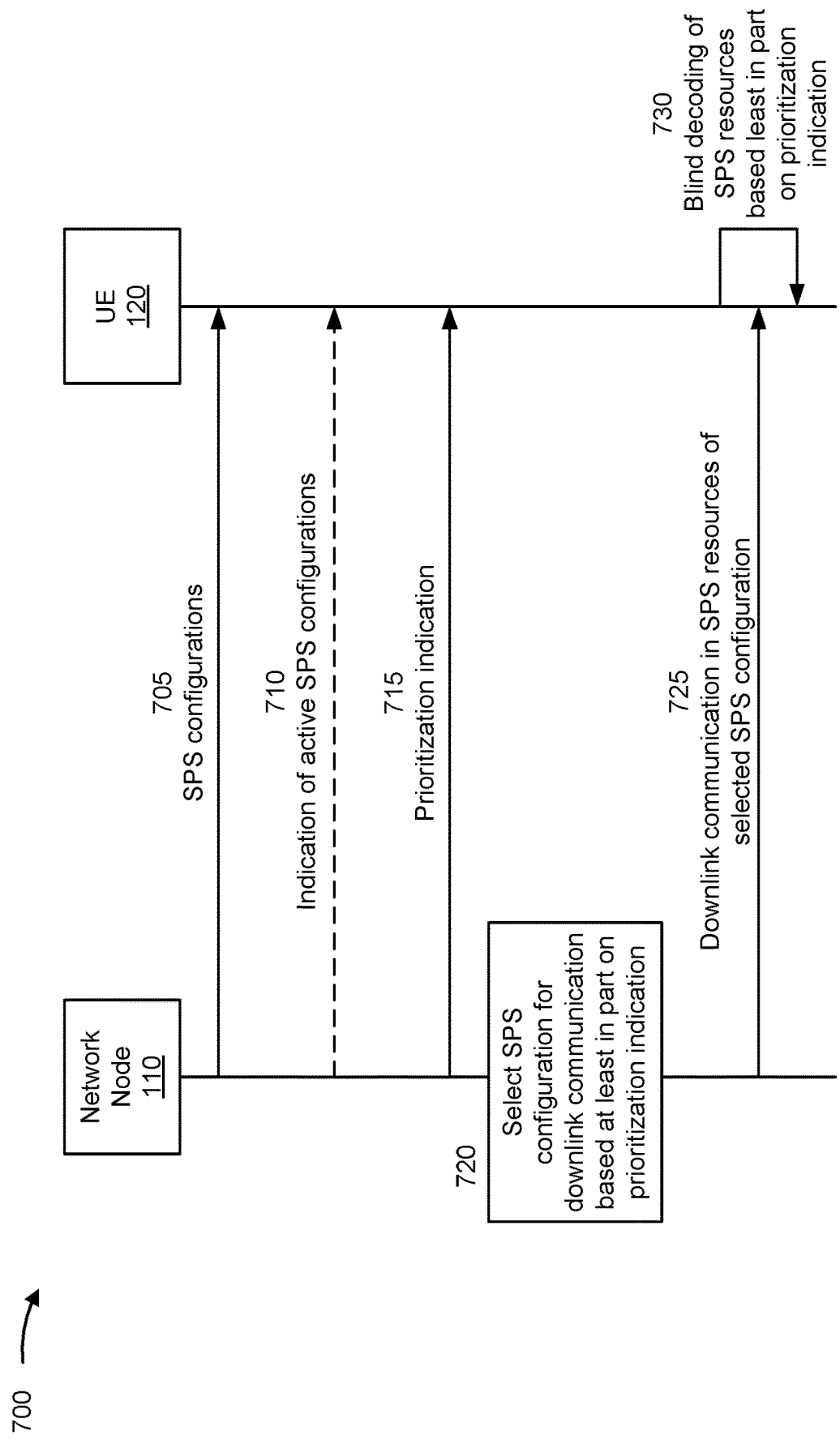
FIG. 7 is a diagram illustrating an example associated with prioritization for reducing SPS blind decoding, in accordance with the present disclosure.

FIG. 7 is a diagram illustrating an example 700 associated with prioritization for reducing SPS blind decoding, in accordance with the present disclosure. As shown in FIG. 7, example 700 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 7, and by reference number 705, the network node 110 may transmit, to the UE 120, a plurality of SPS configurations. The UE 120 may receive the plurality of SPS configurations transmitted by the network node 110. For example, the network node 110 may transmit, and the UE 120 may receive, configuration information that indicates the plurality of SPS configurations. Each SPS configuration, of the plurality of SPS configurations, may indicate a resource allocation for a respective set of SPS resources for receiving SPS downlink communications (e.g., in a time domain, a frequency domain, a spatial domain, and/or a code domain) and a periodicity at which the resource allocation is repeated. In some aspects, the configuration information that indicates the plurality of SPS configurations may be transmitted to the UE 120 in one or more RRC messages.

As further shown in FIG. 7, and by reference number 710, in some aspects, the network node 110 may transmit, and the UE 120 may receive, an indication of active SPS configurations of the plurality of SPS configurations configured for the UE 120. For example, the network node 110 may transmit, and the UE 120 may receive, SPS activation DCI that indicates activation of one or more SPS configurations of the plurality of SPS configurations configured for the UE 120. In some aspects, the network node 110 may transmit the SPS activation DCI to the UE 120 to activate one or more SPS configurations of a type that requires DCI activation. In this case, the periodic SPS occasions for SPS configurations may be activated for the UE 120 based at least in part on the UE 120 receiving the SPS activation DCI.

In some aspects, in a case in which the configuration information indicates a plurality of SPS configurations of a type that does not require DCI activation, the network node 110 may not transmit the indication of the active SPS configurations (e.g., the SPS activation DCI) to the UE 120. In this case, the periodic SPS occasions for the SPS configurations may be activated for the UE 120 based at least in part on the UE 120 receiving the SPS configurations, without receiving the SPS activation DCI.

As further shown in FIG. 7, and by reference number 715, the network node 110 may transmit, to the UE 120, a transmit prioritization indication associated with the plurality of SPS configurations configured for the UE 120. The UE 120 may receive, from the network node 110, the transmit prioritization indication associated with the plurality of SPS configurations. The transmit prioritization indication may indicate a prioritization of the SPS configurations to be applied by the network node 110 for selecting SPS resources in which to transmit a downlink communication (e.g., a PUSCH communication) to the UE 120. In some aspects, the transmit prioritization indication may indicate an order in which the UE 120 is to perform blind decoding of SPS resources for the plurality of SPS configurations (or for multiple active SPS configurations of the plurality SPS configurations). For example, the order of the plurality of SPS configurations (or the multiple active SPS configurations) indicated by the transmit prioritization indication may correspond to an order in which the network node 110 is to prioritize selection of an SPS configuration to use to transmit a downlink communication. In some aspects, the transmit prioritization indication may indicate respective priorities for the plurality of SPS configurations configured for the UE 120. In some aspects, the transmit prioritization indication may indicate respective priorities for multiple active SPS configurations of the plurality of SPS configurations configured for the UE 120.

In some aspects, the network node 110 may transmit the transmit prioritization indication to the UE 120 via L1, L2, or L3 signaling. For example, the transmit prioritization indication may be included in an RRC message, a MAC-CE, or DCI. In some aspects, the transmit prioritization for the plurality of SPS configurations may be semi-statically configured for the UE 120. In some aspects, the transmit prioritization may be dynamically indicated. In some aspects, the transmit prioritization indication may be included in the configuration information that indicates the plurality of SPS configurations. In some aspects, the transmit prioritization indication may be included in the downlink communication (e.g., the SPS activation DCI) that indicates multiple active SPS configurations of the plurality of SPS configurations configured for the UE 120. In some aspects, the transmit prioritization indication may be transmitted in a separate downlink communication from the configuration information and the SPS activation DCI.

In some aspects, the network node 110 may determine the transmit prioritization (e.g., the decoding prioritization for the UE 120) indicated by the transmit prioritization indication based at least in part on a downlink SINR. In some aspects, the UE 120 may transmit an indication of the downlink SINR to the network node 110 (e.g., in a channel state information (CSI) report), and the network node 110 may determine the transmit prioritization indication based at least in part on the indication of the downlink SINR received from the UE 120. In this case, the UE 120 may measure the downlink SINR based at least in part on a downlink reference signal (e.g., a CSI reference signal). For example, in a case in which the downlink SINR is high (e.g., greater than a threshold), SPS configurations with lower MCSs may be deprioritized relative to SPS configurations with higher MCSs, and/or in a case in which the downlink SINR is low (e.g., less than a threshold) SPS configurations with higher MCSs may be deprioritized relative to SPS configurations with lower MCSs. In some aspects, the network node 110 may determine the transmit prioritization indicated by the transmit prioritization indication based at least in part on a comparison of the downlink SINR and one or more thresholds. In some aspects, the transmit prioritization indication may indicate an order of SPS configurations from highest MCS to lowest MCS in connection with a determination that the downlink SINR is greater than a first threshold (T1) and less than a second threshold (T2). For example, in a case in which there are three configured or active SPS configurations, the transmit prioritization indication may indicate an order of SPS1, SPS2, SPS3, where the MCS of SPS1>the MCS of SPS2>the MCS of SPS3, in connection with a determination that T2>SINR>T1. In some aspects, the transmit prioritization indication may indicate an order of SPS configurations from lowest MCS to highest MCS in connection with a determination that the downlink SINR is less than a threshold (e.g., a third threshold (T3)). For example, in a case in which there are three configured or active SPS configurations, the transmit prioritization indication may indicate an order of SPS1, SPS2, SPS3, where the MCS of SPS1<the MCS of SPS2<the MCS of SPS3, in connection with a determination that SINR<T3. In some aspects, the prioritization indicated by the transmit prioritization indication may be defined in or based at least in part on a wireless communication standard (e.g., the 3GPP standard).

As further shown in FIG. 7, and by reference number 720, the network node 110 may select an SPS configuration for transmitting an uplink communication based at least in part on the prioritization indication. In some aspects, in a case in which the SPS resources of multiple active SPS configurations overlap in the time domain (e.g., in the same downlink slot), the network node 110 may select, from the SPS resources of the multiple active SPS configurations, SPS resources in which to transmit an uplink communication based at least in part on the transmit prioritization indication and based at least in part on at least one of an MCS configured for each SPS configuration or a TBS of the downlink communication to be transmitted. The network node 110 may evaluate the SPS resources of the SPS configurations in the order indicated by the transmit prioritization indication, starting with a highest priority SPS configuration, to select an SPS configuration with a sufficient MCS and/or sufficient SPS resources for transmitting the TBS of the downlink communication. For example, the network node 110 may select a highest priority SPS configuration (in accordance with the transmit prioritization indication) with sufficient MCS and/or SPS resources for the downlink communication to be transmitted by the network node 110.

As shown by reference number 725, the network node 110 may transmit the downlink communication in the SPS resources of the selected SPS configuration. For example, the downlink communication may be a PDSCH communication. As shown by reference number 730, the UE 120 may perform blind decoding of the SPS resources of the plurality of SPS configurations based at least in part on the transmit prioritization indication. The UE 120 may receive and decode the downlink communication transmitted by the network node 110 using blind decoding based at least in part on the transmit prioritization indication. In some aspects, in a case in which the SPS resources of multiple active SPS configurations overlap in the time domain (e.g., in the same downlink slot), the UE 120 may perform blind decoding of the SPS resources of one or more of the SPS configurations in the order indicated by the transmit prioritization indication. For example, the UE 120 may perform the blind decoding starting with a highest priority SPS configuration, and the UE 120 may stop blind decoding once the UE 120 detects a downlink communication in the SPS resources of an SPS configuration. By performing the blind decoding of the SPS resources of the SPS configurations in the same order as used by the network node 110 to select the SPS resources in which to transmit the downlink communication, the blind decoding operations performed by the UE 120 to receive and decode the downlink communication may be reduced, as compared to performing blind decoding without the transmit prioritization indication.

As indicated above, FIG. 7 is provided as an example. Other examples may differ from what is described with respect to FIG. 7.

Figure 8:
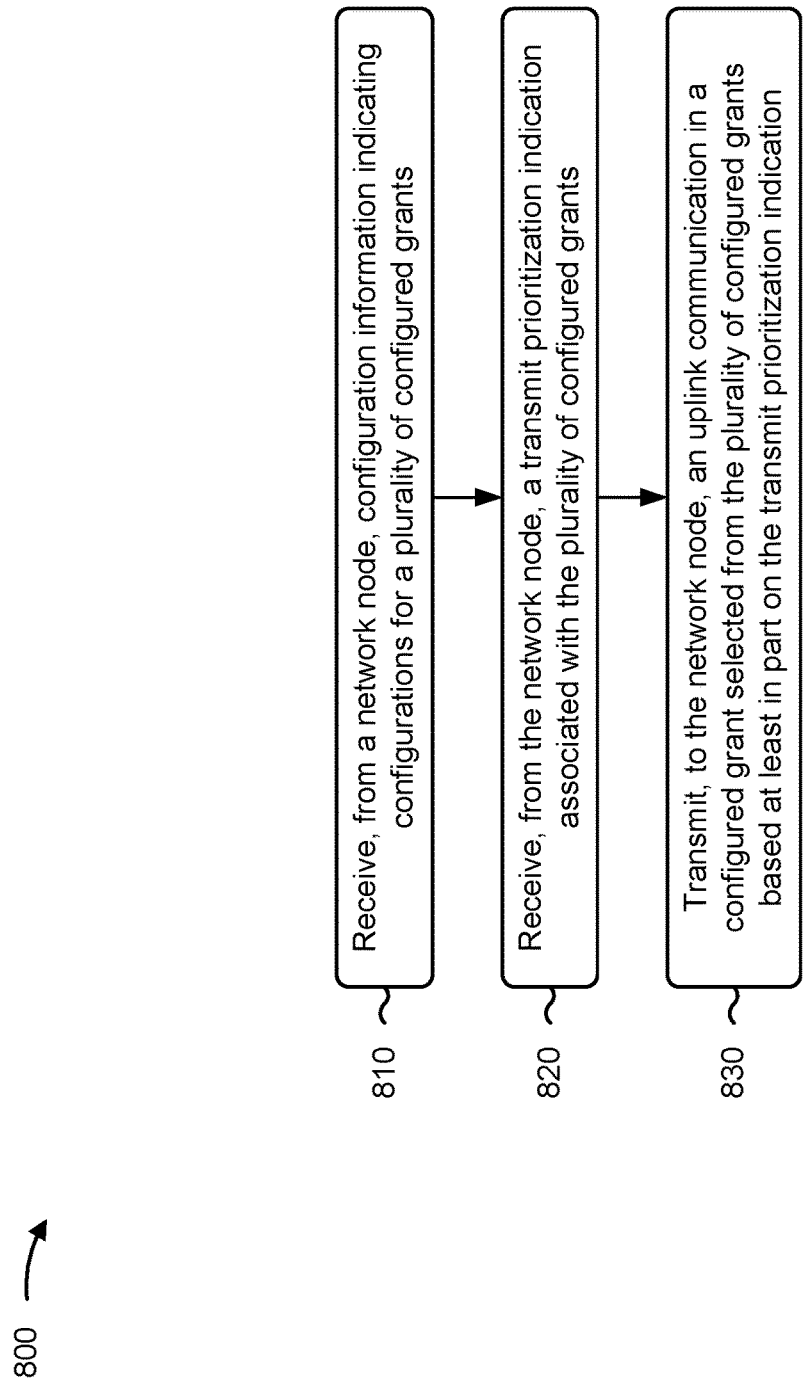
FIGS. 8-9 are diagrams illustrating example processes associated with prioritization for reducing CG blind decoding, in accordance with the present disclosure.

FIG. 8 is a diagram illustrating an example process 800 performed, for example, by a UE, in accordance with the present disclosure. Example process 800 is an example where the UE (e.g., UE 120) performs operations associated with prioritization for reducing CG blind decoding.

As shown in FIG. 8, in some aspects, process 800 may include receiving, from a network node, configuration information indicating configurations for a plurality of configured grants (block 810). For example, the UE (e.g., using communication manager 140 and/or reception component 1202, depicted in FIG. 12) may receive, from a network node, configuration information indicating configurations for a plurality of configured grants, as described above.

As further shown in FIG. 8, in some aspects, process 800 may include receiving, from the network node, a transmit prioritization indication associated with the plurality of configured grants (block 820). For example, the UE (e.g., using communication manager 140 and/or reception component 1202, depicted in FIG. 12) may receive, from the network node, a transmit prioritization indication associated with the plurality of configured grants, as described above.

As further shown in FIG. 8, in some aspects, process 800 may include transmitting, to the network node, an uplink communication in a configured grant selected from the plurality of configured grants based at least in part on the transmit prioritization indication (block 830). For example, the UE (e.g., using communication manager 140 and/or transmission component 1204, depicted in FIG. 12) may transmit, to the network node, an uplink communication in a configured grant selected from the plurality of configured grants based at least in part on the transmit prioritization indication, as described above.

Process 800 may include additional aspects, such as any single aspect or any combination of aspects described below and/or in connection with one or more other processes described elsewhere herein.

In a first aspect, the transmit prioritization indication indicates respective priorities for the plurality of configured grants.

In a second aspect, alone or in combination with the first aspect, the transmit prioritization indication indicates respective priorities for multiple active configured grants of the plurality of configured grants.

In a third aspect, alone or in combination with one or more of the first and second aspects, the transmit prioritization indication indicates an order in which the plurality of configured grants are to be evaluated by the UE to select the configured grant to transmit the uplink communication.

In a fourth aspect, alone or in combination with one or more of the first through third aspects, process 800 includes selecting, from the plurality of configured grants, the configured grant in which the uplink communication is to be transmitted based at least in part on the transmit prioritization indication and based at least in part on at least one of an MCS or a TBS.

In a fifth aspect, alone or in combination with one or more of the first through fourth aspects, the transmit prioritization indication is included in an RRC message, a MAC-CE, or DCI.

In a sixth aspect, alone or in combination with one or more of the first through fifth aspects, the transmit prioritization indication is included in the configuration information.

In a seventh aspect, alone or in combination with one or more of the first through sixth aspects, the transmit prioritization indication is included in a downlink communication that indicates multiple active configured grants of the plurality of configured grants.

In an eighth aspect, alone or in combination with one or more of the first through seventh aspects, the transmit prioritization indication is based at least in part on an uplink SINR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
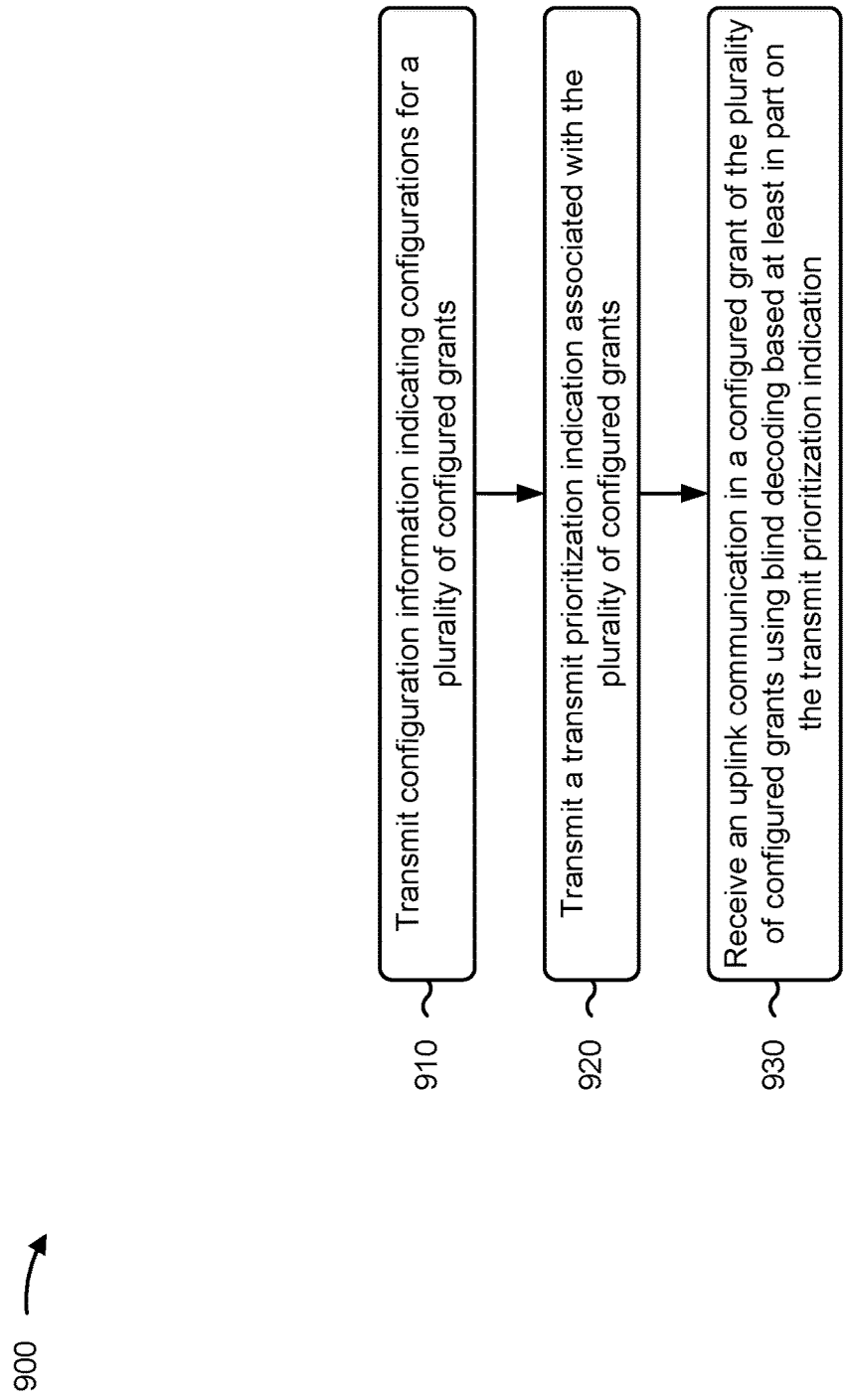

FIG. 9 is a diagram illustrating an example process 900 performed, for example, by a network node, in accordance with the present disclosure. Example process 900 is an example where the network node (e.g., network node 110) performs operations associated with prioritization for reducing CG blind decoding.

As shown in FIG. 9, in some aspects, process 900 may include transmitting, to a UE, configuration information indicating configurations for a plurality of configured grants (block 910). For example, the network node (e.g., using communication manager 150 and/or transmission component 1304, depicted in FIG. 13) may transmit, to a UE, configuration information indicating configurations for a plurality of configured grants, as described above.

As further shown in FIG. 9, in some aspects, process 900 may include transmitting, to the UE, a transmit prioritization indication associated with the plurality of configured grants (block 920). For example, the network node (e.g., using communication manager 150 and/or transmission component 1304, depicted in FIG. 13) may transmit, to the UE, a transmit prioritization indication associated with the plurality of configured grants, as described above.

As further shown in FIG. 9, in some aspects, process 900 may include receiving, from the UE, an uplink communication in a configured grant of the plurality of configured grants using blind decoding based at least in part on the transmit prioritization indication (block 930). For example, the network node (e.g., using communication manager 150 and/or reception component 1302, depicted in FIG. 13) may receive, from the UE, an uplink communication in a configured grant of the plurality of configured grants using blind decoding based at least in part on the transmit prioritization indication, as described above.

Process 900 may include additional aspects, such as any single aspect or any combination of aspects described below and/or in connection with one or more other processes described elsewhere herein.

In a first aspect, the transmit prioritization indication indicates respective priorities for the plurality of configured grants.

In a second aspect, alone or in combination with the first aspect, the transmit prioritization indication indicates respective priorities for multiple active configured grants of the plurality of configured grants.

In a third aspect, alone or in combination with one or more of the first and second aspects, the transmit prioritization indication indicates an order in which blind decoding of the plurality of configured grants is to be performed by the network node.

In a fourth aspect, alone or in combination with one or more of the first through third aspects, receiving the uplink communication in the configured grant of the plurality of configured grants using blind decoding based at least in part on the transmit prioritization indication includes performing blind decoding of one or more configured grants, of the plurality of configured grants, in the order indicated by the transmit prioritization indication.

In a fifth aspect, alone or in combination with one or more of the first through fourth aspects, the transmit prioritization indication is included in an RRC message, a MAC-CE, or DCI.

In a sixth aspect, alone or in combination with one or more of the first through fifth aspects, the transmit prioritization indication is included in the configuration information.

In a seventh aspect, alone or in combination with one or more of the first through sixth aspects, the transmit prioritization indication is included in a downlink communication that indicates multiple active configured grants of the plurality of configured grants.

In an eighth aspect, alone or in combination with one or more of the first through seventh aspects, the transmit prioritization indication is based at least in part on an estimation of an uplink SINR.

In a ninth aspect, alone or in combination with one or more of the first through eighth aspects, process 900 includes determining the transmit prioritization indication based at least in part on a comparison of the estimation of the uplink SINR and one or more thresholds.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
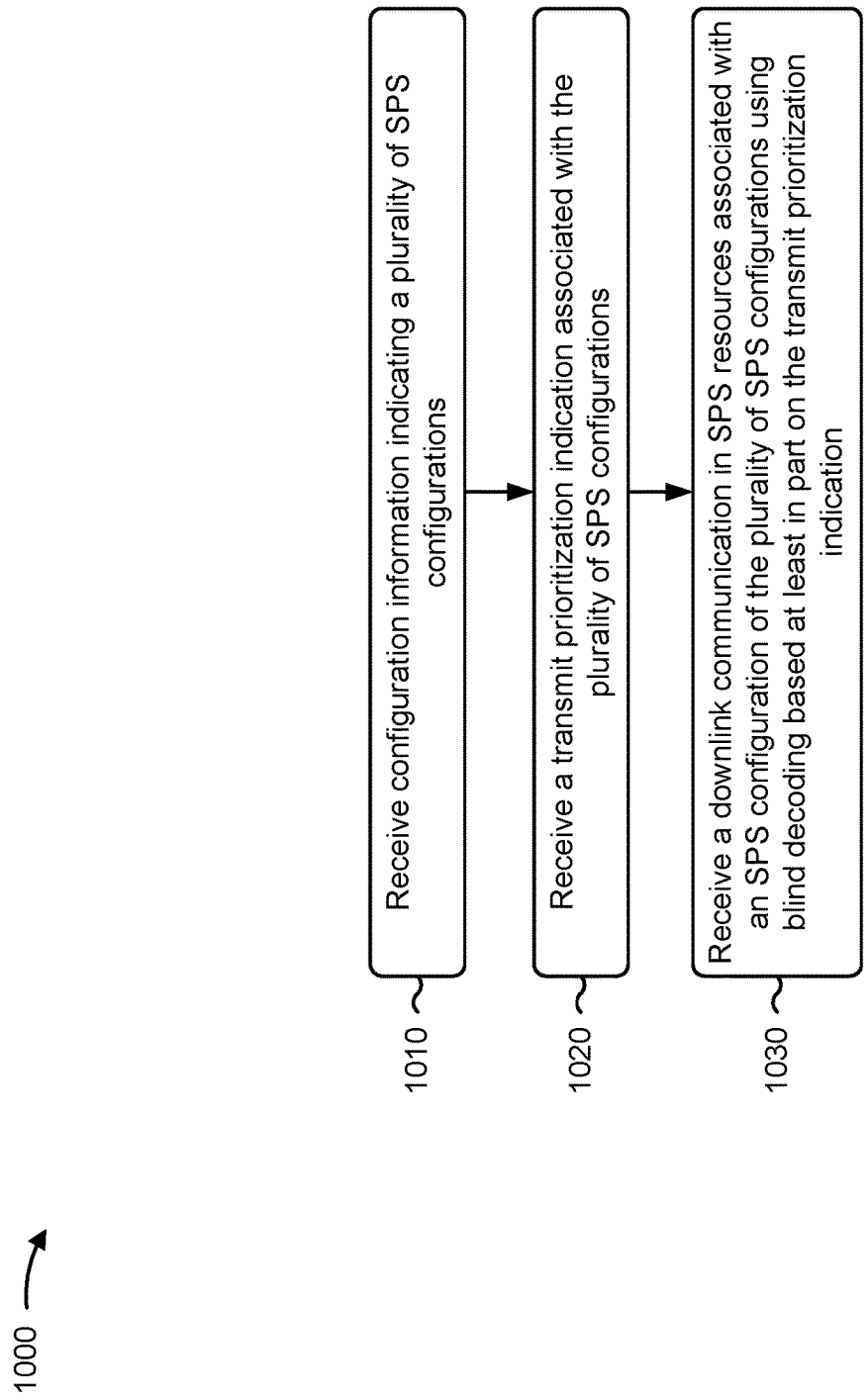
FIGS. 10-11 are diagrams illustrating example processes associated with prioritization for reducing SPS blind decoding, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with prioritization for reducing SPS blind decoding.

As shown in FIG. 10, in some aspects, process 1000 may include receiving, from a network node, configuration information indicating a plurality of SPS configurations (block 1010). For example, the UE (e.g., using communication manager 140 and/or reception component 1202, depicted in FIG. 12) may receive, from a network node, configuration information indicating a plurality of SPS configurations, as described above.

As further shown in FIG. 10, in some aspects, process 1000 may include receiving, from the network node, a transmit prioritization indication associated with the plurality of SPS configurations (block 1020). For example, the UE (e.g., using communication manager 140 and/or reception component 1202, depicted in FIG. 12) may receive, from the network node, a transmit prioritization indication associated with the plurality of SPS configurations, as described above.

As further shown in FIG. 10, in some aspects, process 1000 may include receiving, from the network node, a downlink communication in SPS resources associated with an SPS configuration of the plurality of SPS configurations using blind decoding based at least in part on the transmit prioritization indication (block 1030). For example, the UE (e.g., using communication manager 140 and/or reception component 1202, depicted in FIG. 12) may receive, from the network node, a downlink communication in SPS resources associated with an SPS configuration of the plurality of SPS configurations using blind decoding based at least in part on the transmit prioritization indication, as described above.

Process 1000 may include additional aspects, such as any single aspect or any combination of aspects described below and/or in connection with one or more other processes described elsewhere herein.

In a first aspect, the transmit prioritization indication indicates respective priorities for the plurality of SPS configurations.

In a second aspect, alone or in combination with the first aspect, the transmit prioritization indication indicates respective priorities for multiple active SPS configurations of the plurality of SPS configurations.

In a third aspect, alone or in combination with one or more of the first and second aspects, the transmit prioritization indication indicates an order in which blind decoding of SPS resources associated with the plurality of SPS configurations is to be performed by the UE.

In a fourth aspect, alone or in combination with one or more of the first through third aspects, receiving the downlink communication in the SPS resources associated with the SPS configuration of the plurality of SPS configurations using blind decoding based at least in part on the transmit prioritization indication includes performing blind decoding of SPS resources associated with one or more SPS configurations, of the plurality of SPS configurations, in the order indicated by the transmit prioritization indication.

In a fifth aspect, alone or in combination with one or more of the first through fourth aspects, the transmit prioritization indication is included in an RRC message, a MAC-CE, or DCI.

In a sixth aspect, alone or in combination with one or more of the first through fifth aspects, the transmit prioritization indication is included in the configuration information.

In a seventh aspect, alone or in combination with one or more of the first through sixth aspects, the transmit prioritization indication is included in a downlink communication that indicates multiple active SPS configurations of the plurality of SPS configurations.

In an eighth aspect, alone or in combination with one or more of the first through seventh aspects, process 1000 includes transmitting, to the network node, an indication of a downlink SINR, wherein the transmit prioritization indication is based at least in part on the indication of the downlink SINR.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
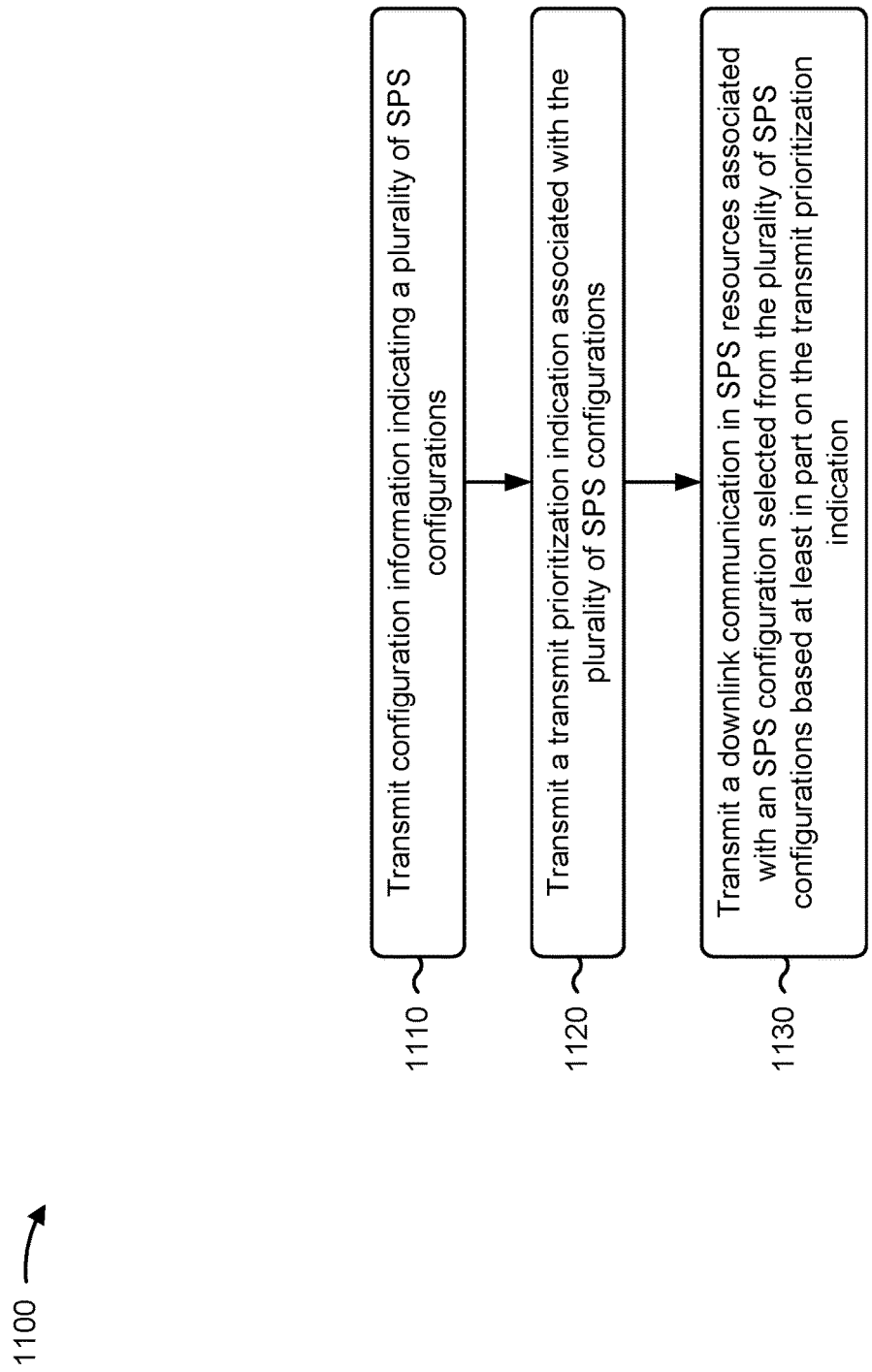

FIG. 11 is a diagram illustrating an example process 1100 performed, for example, by a network node, in accordance with the present disclosure. Example process 1100 is an example where the network node (e.g., network node 110) performs operations associated with prioritization for reducing SPS blind decoding.

As shown in FIG. 11, in some aspects, process 1100 may include transmitting, to a UE, configuration information indicating a plurality of SPS configurations (block 1110). For example, the network node (e.g., using communication manager 150 and/or transmission component 1304, depicted in FIG. 13) may transmit, to a UE, configuration information indicating a plurality of SPS configurations, as described above.

As further shown in FIG. 11, in some aspects, process 1100 may include transmitting, to the UE, a transmit prioritization indication associated with the plurality of SPS configurations (block 1120). For example, the network node (e.g., using communication manager 150 and/or transmission component 1304, depicted in FIG. 13) may transmit, to the UE, a transmit prioritization indication associated with the plurality of SPS configurations, as described above.

As further shown in FIG. 11, in some aspects, process 1100 may include transmitting, to the UE, a downlink communication in SPS resources associated with an SPS configuration selected from the plurality of SPS configurations based at least in part on the transmit prioritization indication (block 1130). For example, the network node (e.g., using communication manager 150 and/or transmission component 1304, depicted in FIG. 13) may transmit, to the UE, a downlink communication in SPS resources associated with an SPS configuration selected from the plurality of SPS configurations based at least in part on the transmit prioritization indication, as described above.

Process 1100 may include additional aspects, such as any single aspect or any combination of aspects described below and/or in connection with one or more other processes described elsewhere herein.

In a first aspect, the transmit prioritization indication indicates respective priorities for the plurality of SPS configurations.

In a second aspect, alone or in combination with the first aspect, the transmit prioritization indication indicates respective priorities for multiple active SPS configurations of the plurality of SPS configurations.

In a third aspect, alone or in combination with one or more of the first and second aspects, the transmit prioritization indication indicates an order in which blind decoding of the plurality of configured grants is to be performed by the UE.

In a fourth aspect, alone or in combination with one or more of the first through third aspects, the transmit prioritization indication is included in an RRC message, a MAC-CE, or DCI.

In a fifth aspect, alone or in combination with one or more of the first through fourth aspects, the transmit prioritization indication is included in the configuration information.

In a sixth aspect, alone or in combination with one or more of the first through fifth aspects, the transmit prioritization indication is included in a downlink communication that indicates multiple active SPS configurations of the plurality of SPS configurations.

In a seventh aspect, alone or in combination with one or more of the first through sixth aspects, the transmit prioritization indication is based at least in part on an indication, received from the UE, of a downlink SINR.

In an eighth aspect, alone or in combination with one or more of the first through seventh aspects, process 1100 includes determining the transmit prioritization indication based at least in part on a comparison of the downlink SINR and one or more thresholds.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
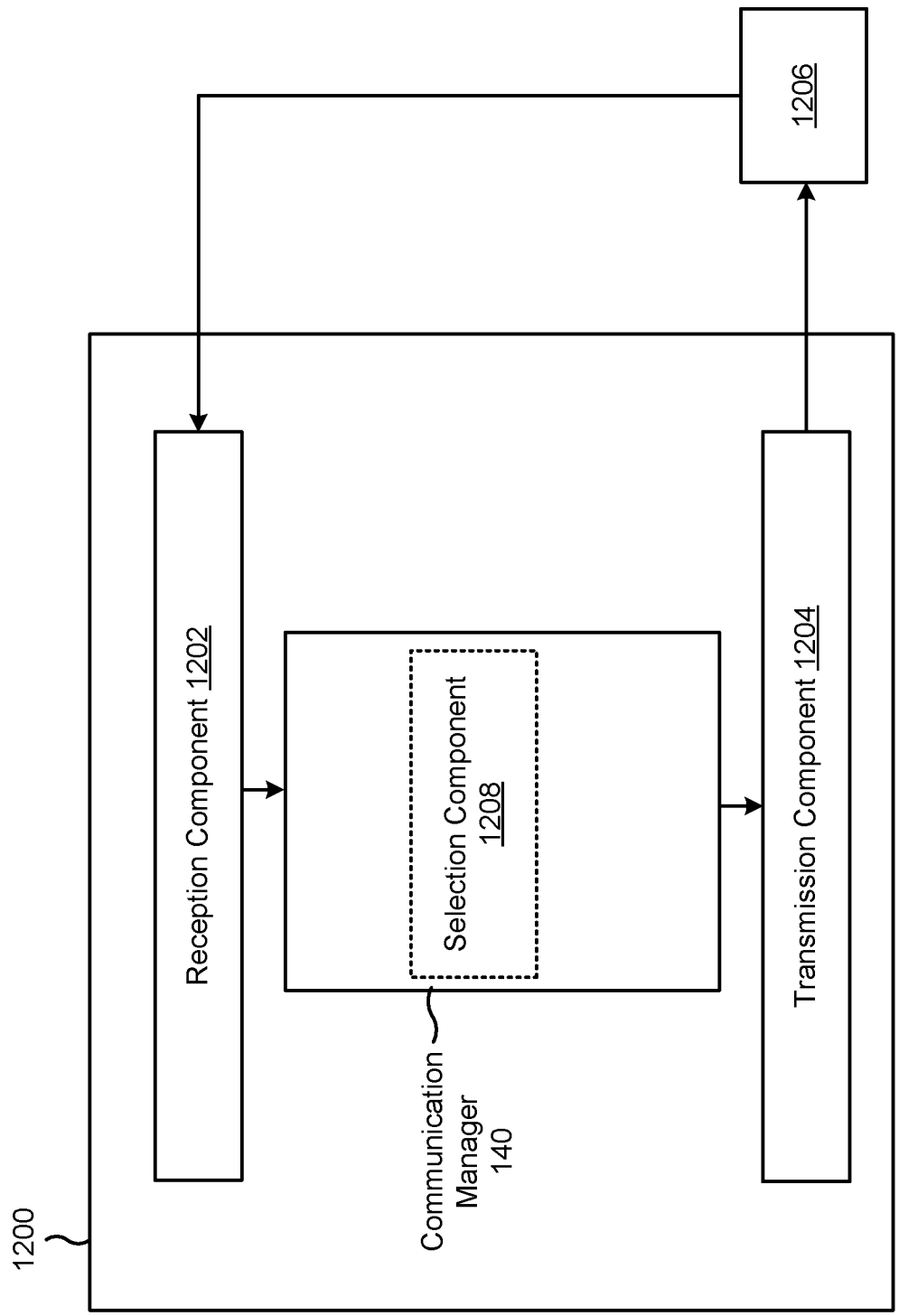
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a selection component 1208, among other examples.

In some aspects, the apparatus 1200 may be configured to perform one or more operations described herein in connection with FIGS. 5-7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a network node, configuration information indicating configurations for a plurality of configured grants. The reception component 1202 may receive, from the network node, a transmit prioritization indication associated with the plurality of configured grants. The transmission component 1204 may transmit, to the network node, an uplink communication in a configured grant selected from the plurality of configured grants based at least in part on the transmit prioritization indication.

The selection component 1208 may select, from the plurality of configured grants, the configured grant in which the uplink communication is to be transmitted based at least in part on the transmit prioritization indication and based at least in part on at least one of an MCS or a TBS.

The reception component 1202 may receive, from a network node, configuration information indicating a plurality of SPS configurations. The reception component 1202 may receive, from the network node, a transmit prioritization indication associated with the plurality of SPS configurations. The reception component 1202 may receive, from the network node, a downlink communication in SPS resources associated with an SPS configuration of the plurality of SPS configurations using blind decoding based at least in part on the transmit prioritization indication.

The transmission component 1204 may transmit, to the network node, an indication of a downlink SINR, wherein the transmit prioritization indication is based at least in part on the indication of the downlink SINR.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
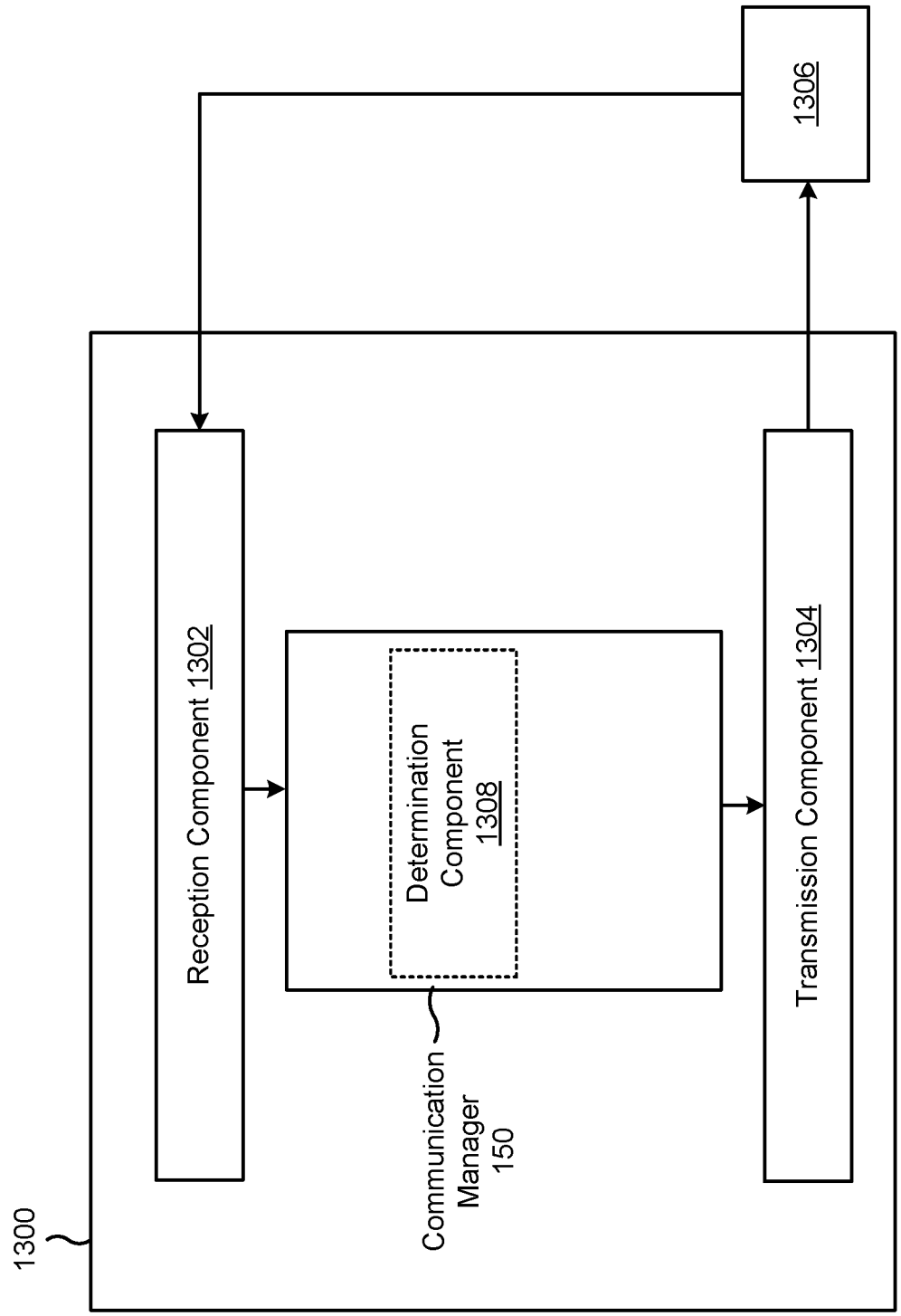

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a determination component 1308, among other examples.

In some aspects, the apparatus 1300 may be configured to perform one or more operations described herein in connection with FIGS. 5-7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit, to a UE, configuration information indicating configurations for a plurality of configured grants. The transmission component 1304 may transmit, to the UE, a transmit prioritization indication associated with the plurality of configured grants. The reception component 1302 may receive, from the UE, an uplink communication in a configured grant of the plurality of configured grants using blind decoding based at least in part on the transmit prioritization indication.

The determination component 1308 may determine the transmit prioritization indication based at least in part on a comparison of the estimation of the uplink SINR and one or more thresholds.

The transmission component 1304 may transmit, to a UE, configuration information indicating a plurality of SPS configurations. The transmission component 1304 may transmit, to the UE, a transmit prioritization indication associated with the plurality of SPS configurations. The transmission component 1304 may transmit, to the UE, a downlink communication in SPS resources associated with an SPS configuration selected from the plurality of SPS configurations based at least in part on the transmit prioritization indication.

The determination component 1308 may determine the transmit prioritization indication based at least in part on a comparison of the downlink SINR and one or more thresholds.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a network node, configuration information indicating configurations for a plurality of configured grants; receiving, from the network node, a transmit prioritization indication associated with the plurality of configured grants; and transmitting, to the network node, an uplink communication in a configured grant selected from the plurality of configured grants based at least in part on the transmit prioritization indication.

Aspect 2: The method of Aspect 1, wherein the transmit prioritization indication indicates respective priorities for the plurality of configured grants.

Aspect 3: The method of any of Aspects 1-2, wherein the transmit prioritization indication indicates respective priorities for multiple active configured grants of the plurality of configured grants.

Aspect 4: The method of any of Aspects 1-3, wherein the transmit prioritization indication indicates an order in which the plurality of configured grants are to be evaluated by the UE to select the configured grant to transmit the uplink communication.

Aspect 5: The method of any of Aspects 1-4, further comprising: selecting, from the plurality of configured grants, the configured grant in which the uplink communication is to be transmitted based at least in part on the transmit prioritization indication and based at least in part on at least one of a modulation and coding scheme (MCS) or a transport block size (TBS).

Aspect 6: The method of any of Aspects 1-5, wherein the transmit prioritization indication is included in a radio resource control (RRC) message, a medium access control (MAC) control element (MAC-CE), or downlink control information (DCI).

Aspect 7: The method of any of Aspects 1-6, wherein the transmit prioritization indication is included in the configuration information.

Aspect 8: The method of any of Aspects 1-6, wherein the transmit prioritization indication is included in a downlink communication that indicates multiple active configured grants of the plurality of configured grants.

Aspect 9: The method of any of Aspects 1-8, wherein the transmit prioritization indication is based at least in part on an uplink signal-to-interference-plus-noise ratio (SINR).

Aspect 10: A method of wireless communication performed by a network node, comprising: transmitting, to a user equipment (UE), configuration information indicating configurations for a plurality of configured grants; transmitting, to the UE, a transmit prioritization indication associated with the plurality of configured grants; and receiving, from the UE, an uplink communication in a configured grant of the plurality of configured grants using blind decoding based at least in part on the transmit prioritization indication.

Aspect 11: The method of Aspect 10, wherein the transmit prioritization indication indicates respective priorities for the plurality of configured grants.

Aspect 12: The method of any of Aspects 10-11, wherein the transmit prioritization indication indicates respective priorities for multiple active configured grants of the plurality of configured grants.

Aspect 13: The method of any of Aspects 10-12, wherein the transmit prioritization indication indicates an order in which blind decoding of the plurality of configured grants is to be performed by the network node.

Aspect 14: The method of Aspect 13, wherein receiving the uplink communication in the configured grant of the plurality of configured grants using blind decoding based at least in part on the transmit prioritization indication comprises: performing blind decoding of one or more configured grants, of the plurality of configured grants, in the order indicated by the transmit prioritization indication.

Aspect 15: The method of any of Aspects 10-14, wherein the transmit prioritization indication is included in a radio resource control (RRC) message, a medium access control (MAC) control element (MAC-CE), or downlink control information (DCI).

Aspect 16: The method of any of Aspects 10-15, wherein the transmit prioritization indication is included in the configuration information.

Aspect 17: The method of any of Aspects 10-15, wherein the transmit prioritization indication is included in a downlink communication that indicates multiple active configured grants of the plurality of configured grants.

Aspect 18: The method of any of Aspects 10-17, wherein the transmit prioritization indication is based at least in part on an estimation of an uplink signal-to-interference-plus-noise ratio (SINR).

Aspect 19: The method of Aspect 18, further comprising: determining the transmit prioritization indication based at least in part on a comparison of the estimation of the uplink SINR and one or more thresholds.

Aspect 20: A method of wireless communication performed by a user equipment (UE), comprising: receiving, from a network node, configuration information indicating a plurality of semi-persistent scheduling (SPS) configurations; receiving, from the network node, a transmit prioritization indication associated with the plurality of SPS configurations; and receiving, from the network node, a downlink communication in SPS resources associated with an SPS configuration of the plurality of SPS configurations using blind decoding based at least in part on the transmit prioritization indication.

Aspect 21: The method of Aspect 20, wherein the transmit prioritization indication indicates respective priorities for the plurality of SPS configurations.

Aspect 22: The method of any of Aspects 20-21, wherein the transmit prioritization indication indicates respective priorities for multiple active SPS configurations of the plurality of SPS configurations.

Aspect 23: The method of any of Aspects 20-22, wherein the transmit prioritization indication indicates an order in which blind decoding of SPS resources associated with the plurality of SPS configurations is to be performed by the UE.

Aspect 24: The method of Aspect 23, wherein receiving the downlink communication in the SPS resources associated with the SPS configuration of the plurality of SPS configurations using blind decoding based at least in part on the transmit prioritization indication comprises: performing blind decoding of SPS resources associated with one or more SPS configurations, of the plurality of SPS configurations, in the order indicated by the transmit prioritization indication.

Aspect 25: The method of any of Aspects 20-24, wherein the transmit prioritization indication is included in a radio resource control (RRC) message, a medium access control (MAC) control element (MAC-CE), or downlink control information (DCI).

Aspect 26: The method of any of Aspects 20-25, wherein the transmit prioritization indication is included in the configuration information.

Aspect 27: The method of any of Aspects 20-25, wherein the transmit prioritization indication is included in a downlink communication that indicates multiple active SPS configurations of the plurality of SPS configurations.

Aspect 28: The method of any of Aspects 20-27, further comprising: transmitting, to the network node, an indication of a downlink signal-to-interference-plus-noise ratio (SINR), wherein the transmit prioritization indication is based at least in part on the indication of the downlink SINR.

Aspect 29: A method of wireless communication performed by a network node, comprising: transmitting, to a user equipment (UE), configuration information indicating a plurality of semi-persistent scheduling (SPS) configurations; transmitting, to the UE, a transmit prioritization indication associated with the plurality of SPS configurations; and transmitting, to the UE, a downlink communication in SPS resources associated with an SPS configuration selected from the plurality of SPS configurations based at least in part on the transmit prioritization indication.

Aspect 30: The method of Aspect 29, wherein the transmit prioritization indication indicates respective priorities for the plurality of SPS configurations.

Aspect 31: The method of any of Aspects 29-30, wherein the transmit prioritization indication indicates respective priorities for multiple active SPS configurations of the plurality of SPS configurations.

Aspect 32: The method of any of Aspects 29-31, wherein the transmit prioritization indication indicates an order in which blind decoding of the plurality of configured grants is to be performed by the UE.

Aspect 33: The method of any of Aspects 29-32, wherein the transmit prioritization indication is included in a radio resource control (RRC) message, a medium access control (MAC) control element (MAC-CE), or downlink control information (DCI).

Aspect 34: The method of any of Aspects 29-33, wherein the transmit prioritization indication is included in the configuration information.

Aspect 35: The method of any of Aspects 29-33, wherein the transmit prioritization indication is included in a downlink communication that indicates multiple active SPS configurations of the plurality of SPS configurations.

Aspect 36: The method of any of Aspects 29-35, wherein the transmit prioritization indication is based at least in part on an indication, received from the UE, of a downlink signal-to-interference-plus-noise ratio (SINR).

Aspect 37: The method of Aspect 36, further comprising: determining the transmit prioritization indication based at least in part on a comparison of the downlink SINR and one or more thresholds.

Aspect 38: An apparatus for wireless communication at a device, comprising a processor; memory coupled with the processor; and instructions stored in the memory and executable by the processor to cause the apparatus to perform the method of one or more of Aspects 1-9.

Aspect 39: A device for wireless communication, comprising a memory and one or more processors coupled to the memory, the one or more processors configured to perform the method of one or more of Aspects 1-9.

Aspect 40: An apparatus for wireless communication, comprising at least one means for performing the method of one or more of Aspects 1-9.

Aspect 41: A non-transitory computer-readable medium storing code for wireless communication, the code comprising instructions executable by a processor to perform the method of one or more of Aspects 1-9.

Aspect 42: A non-transitory computer-readable medium storing a set of instructions for wireless communication, the set of instructions comprising one or more instructions that, when executed by one or more processors of a device, cause the device to perform the method of one or more of Aspects 1-9.

Aspect 43: An apparatus for wireless communication at a device, comprising a processor; memory coupled with the processor; and instructions stored in the memory and executable by the processor to cause the apparatus to perform the method of one or more of Aspects 10-19.

Aspect 44: A device for wireless communication, comprising a memory and one or more processors coupled to the memory, the one or more processors configured to perform the method of one or more of Aspects 10-19.

Aspect 45: An apparatus for wireless communication, comprising at least one means for performing the method of one or more of Aspects 10-19.

Aspect 46: A non-transitory computer-readable medium storing code for wireless communication, the code comprising instructions executable by a processor to perform the method of one or more of Aspects 10-19.

Aspect 47: A non-transitory computer-readable medium storing a set of instructions for wireless communication, the set of instructions comprising one or more instructions that, when executed by one or more processors of a device, cause the device to perform the method of one or more of Aspects 10-19.

Aspect 48: An apparatus for wireless communication at a device, comprising a processor; memory coupled with the processor; and instructions stored in the memory and executable by the processor to cause the apparatus to perform the method of one or more of Aspects 20-28.

Aspect 49: A device for wireless communication, comprising a memory and one or more processors coupled to the memory, the one or more processors configured to perform the method of one or more of Aspects 20-28.

Aspect 50: An apparatus for wireless communication, comprising at least one means for performing the method of one or more of Aspects 20-28.

Aspect 51: A non-transitory computer-readable medium storing code for wireless communication, the code comprising instructions executable by a processor to perform the method of one or more of Aspects 20-28.

Aspect 52: A non-transitory computer-readable medium storing a set of instructions for wireless communication, the set of instructions comprising one or more instructions that, when executed by one or more processors of a device, cause the device to perform the method of one or more of Aspects 20-28.

Aspect 53: An apparatus for wireless communication at a device, comprising a processor; memory coupled with the processor; and instructions stored in the memory and executable by the processor to cause the apparatus to perform the method of one or more of Aspects 29-37.

Aspect 54: A device for wireless communication, comprising a memory and one or more processors coupled to the memory, the one or more processors configured to perform the method of one or more of Aspects 29-37.

Aspect 55: An apparatus for wireless communication, comprising at least one means for performing the method of one or more of Aspects 29-37.

Aspect 56: A non-transitory computer-readable medium storing code for wireless communication, the code comprising instructions executable by a processor to perform the method of one or more of Aspects 29-37.

Aspect 57: A non-transitory computer-readable medium storing a set of instructions for wireless communication, the set of instructions comprising one or more instructions that, when executed by one or more processors of a device, cause the device to perform the method of one or more of Aspects 29-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node, configuration information indicating configurations for a plurality of configured grants;
   receiving, from the network node, a transmit prioritization indication associated with the plurality of configured grants,
      wherein the transmit prioritization indication is based at least in part on an uplink signal-to-interference-plus-noise ratio (SINR);
   selecting, from the plurality of configured grants, a configured grant in which an uplink communication is to be transmitted based at least in part on the transmit prioritization indication; and
   transmitting, to the network node, the uplink communication in the configured grant.

2. The method of claim 1, wherein the transmit prioritization indication indicates respective priorities for the plurality of configured grants.

3. The method of claim 1, wherein the transmit prioritization indication indicates respective priorities for multiple active configured grants of the plurality of configured grants.

4. The method of claim 1, wherein the transmit prioritization indication indicates an order in which the plurality of configured grants are to be evaluated by the UE to select the configured grant to transmit the uplink communication.

5. The method of claim 1, wherein the configured grant is selected further based at least in part on at least one of a modulation and coding scheme (MCS) or a transport block size (TBS).

6. The method of claim 1, wherein the transmit prioritization indication is included in a radio resource control (RRC) message, a medium access control (MAC) control element (MAC-CE), or downlink control information (DCI).

7. The method of claim 1, wherein the transmit prioritization indication is included in the configuration information.

8. The method of claim 1, wherein the transmit prioritization indication is included in a downlink communication that indicates multiple active configured grants of the plurality of configured grants.

9. A user equipment (UE) for wireless communication, comprising:
   one or more memories; and
   one or more processors, coupled to the one or more memories, configured to:
      receive, from a network node, configuration information indicating configurations for a plurality of configured grants;
      receive, from the network node, a transmit prioritization indication associated with the plurality of configured grants,
         wherein the transmit prioritization indication is based at least in part on an uplink signal-to-interference-plus-noise ratio (SINR);
      select, from the plurality of configured grants, a configured grant in which an uplink communication is to be transmitted based at least in part on the transmit prioritization indication; and
      transmit, to the network node, the uplink communication in the configured grant.

10. The UE of claim 9, wherein the transmit prioritization indication indicates respective priorities for the plurality of configured grants.

11. The UE of claim 9, wherein the transmit prioritization indication indicates respective priorities for multiple active configured grants of the plurality of configured grants.

12. The UE of claim 9, wherein the transmit prioritization indication indicates an order in which the plurality of configured grants are to be evaluated by the UE to select the configured grant to transmit the uplink communication.

13. The UE of claim 9, wherein the one or more processors, to select, from the plurality of configured grants, the configured grant, are further configured to:
   select, from the plurality of configured grants, the configured grant based at least in part on at least one of a modulation and coding scheme (MCS) or a transport block size (TBS).

14. The UE of claim 9, wherein the transmit prioritization indication is included in a radio resource control (RRC) message, a medium access control (MAC) control element (MAC-CE), or downlink control information (DCI).

15. The UE of claim 9, wherein the transmit prioritization indication is included in the configuration information.

16. The UE of claim 9, wherein the transmit prioritization indication is included in a downlink communication that indicates multiple active configured grants of the plurality of configured grants.

17. A method of wireless communication performed by a network node, comprising:
   transmitting, to a user equipment (UE), configuration information indicating configurations for a plurality of configured grants;

transmitting, to the UE, a transmit prioritization indication associated with the plurality of configured grants,
wherein the transmit prioritization indication is based at least in part on an uplink signal-to-interference-plus-noise ratio (SINR); and
receiving, from the UE, an uplink communication in a configured grant, of the plurality of configured grants, that is selected based at least in part on the transmit prioritization indication.

18. The method of claim 17, wherein the transmit prioritization indication indicates respective priorities for the plurality of configured grants.

19. The method of claim 17, wherein the transmit prioritization indication indicates respective priorities for multiple active configured grants of the plurality of configured grants.

20. The method of claim 17, wherein the transmit prioritization indication indicates an order in which the plurality of configured grants are to be evaluated.

21. The method of claim 17, further comprising:
performing blind decoding of the plurality of configured grants based at least in part on the transmit prioritization indication.

22. The method of claim 17, wherein the transmit prioritization indication is included in a radio resource control (RRC) message, a medium access control (MAC) control element (MAC-CE), or downlink control information (DCI).

23. The method of claim 17, wherein the transmit prioritization indication is included in the configuration information.

24. The method of claim 17, wherein the transmit prioritization indication is included in a downlink communication that indicates multiple active configured grants of the plurality of configured grants.

25. A network node for wireless communication, comprising:
one or more memories; and
one or more processors, coupled to the one or more memories, configured to:
transmit, to a user equipment (UE), configuration information indicating configurations for a plurality of configured grants;
transmit, to the UE, a transmit prioritization indication associated with the plurality of configured grants,
wherein the transmit prioritization indication is based at least in part on an uplink signal-to-interference-plus-noise ratio (SINR); and
receive, from the UE, an uplink communication in a configured grant, of the plurality of configured grants, that is selected based at least in part on the transmit prioritization indication.

26. The network node of claim 25, wherein the transmit prioritization indication indicates respective priorities for the plurality of configured grants.

27. The network node of claim 25, wherein the transmit prioritization indication indicates respective priorities for multiple active configured grants of the plurality of configured grants.

28. The network node of claim 25, wherein the transmit prioritization indication indicates an order in which the plurality of configured grants are to be evaluated.

29. The network node of claim 25, wherein the one or more processors are configured to:
perform blind decoding of the plurality of configured grants based at least in part on the transmit prioritization indication.

30. The network node of claim 25, wherein the transmit prioritization indication is included in a radio resource control (RRC) message, a medium access control (MAC) control element (MAC-CE), or downlink control information (DCI).

* * * * *